(12) United States Patent
Hetrich et al.

(10) Patent No.: US 12,062,208 B2
(45) Date of Patent: Aug. 13, 2024

(54) MULTI-STAGE AUTONOMOUS LOCALIZATION ARCHITECTURE FOR CHARGING ELECTRIC VEHICLES

(71) Applicant: ABB E-mobility B.V., Delft (NL)

(72) Inventors: Matthew Hetrich, Raleigh, NC (US); Gregory A. Cole, West Hartford, CT (US)

(73) Assignee: ABB E-mobility B.V., Delft (NL)

( * ) Notice: Subject to any disclaimer, the term of this patent is extended or adjusted under 35 U.S.C. 154(b) by 0 days.

(21) Appl. No.: 17/331,222

(22) Filed: May 26, 2021

(65) Prior Publication Data

US 2022/0383543 A1 Dec. 1, 2022

(51) Int. Cl.
| | |
|---|---|
| *B60L 53/37* | (2019.01) |
| *G06T 7/70* | (2017.01) |
| *G06T 7/73* | (2017.01) |
| *G06V 10/75* | (2022.01) |
| *G06V 10/82* | (2022.01) |
| *H04N 23/695* | (2023.01) |

(52) U.S. Cl.
CPC .............. *G06T 7/74* (2017.01); *B60L 53/37* (2019.02); *G06T 7/70* (2017.01); *G06T 7/73* (2017.01); *G06V 10/757* (2022.01); *G06V 10/82* (2022.01); *H04N 23/695* (2023.01); *G06T 2207/20081* (2013.01); *G06T 2207/20084* (2013.01); *G06T 2207/30244* (2013.01); *G06T 2207/30252* (2013.01)

(58) Field of Classification Search
CPC .... G06T 7/74; G06T 7/70; G06T 7/73; G06T 2207/20081; G06T 2207/20084; G06T 2207/30244; G06T 2207/30252; B60L 53/37; G06V 10/757; G06V 10/82; H04N 5/23299

See application file for complete search history.

(56) References Cited

U.S. PATENT DOCUMENTS

| | | | |
|---|---|---|---|
| 11,295,477 B1* | 4/2022 | Wang | G06T 7/50 |
| 2020/0101855 A1* | 4/2020 | Lee | B60L 53/57 |
| 2021/0165997 A1* | 6/2021 | Cai | G06T 7/73 |
| 2021/0312662 A1* | 10/2021 | Bigontina | G06F 3/011 |
| 2021/0390376 A1* | 12/2021 | Byrne | G06N 3/0454 |
| 2022/0055495 A1* | 2/2022 | Labell | B60L 53/37 |

FOREIGN PATENT DOCUMENTS

CN 112097663 A * 12/2020

* cited by examiner

*Primary Examiner* — Tat C Chio
(74) *Attorney, Agent, or Firm* — Leydig, Voit & Mayer, Ltd.

(57) ABSTRACT

An automated charging system for an electric vehicle is disclosed that includes a plug with a built-in camera assembly. The camera assembly captures images of a charging port of the electric vehicle, which are processed by one or more processors to estimate the location of the charging port relative to the plug. A multi-stage localization architecture is described that includes a gross localization procedure and a fine localization procedure. The gross localization procedure can implement a first convolutional neural network (CNN) to estimate a position of an object in the image. The fine localization procedure can implement a second CNN to estimate a position and orientation of the object. Actuators for moving the plug in a three-dimensional space can be controlled by the multi-stage localization architecture.

22 Claims, 12 Drawing Sheets

MULTI-STAGE AUTONOMOUS LOCALIZATION ARCHITECTURE FOR CHARGING ELECTRIC VEHICLES

TECHNICAL FIELD

The application relates to electric vehicle technology. More specifically, the application is directed to a technique for autonomously aligning a plug with a charging port of an electric vehicle.

BACKGROUND

Electric vehicles such as the Tesla Model S as well as plug-in hybrid vehicles and others are gaining ground in today's marketplace compared to traditional internal combustion engine (ICE) vehicles. As more drivers adopt this new technology, the infrastructure that is needed to support these systems is being created. Gas stations are being supplemented with charging stations, parking lots have added dedicated parking spots for electric vehicles with access to charging cables, and high-speed, DC charging locations, which may be referred to as supercharger, are popping up along major highways to allow electric vehicle drivers to take longer range trips.

In addition to commercial infrastructure being developed to entice more people to purchase electric vehicles, devices and systems to support the electric vehicle at a person's residence are also being developed. In the beginning, most early adopters of electric vehicles were required to charge the vehicle using a simple extension cord that would charge the vehicle at a slow rate of speed. Subsequently, faster chargers using high voltage (e.g., 240 or 480 VAC) were adopted to increase the speed at which the vehicle was charged. However, these systems typically required some electrical work to be performed at the user's home as these high voltage supplies are not as common as the lower voltage 120 VAC supply in the US marketplace.

Many of these solutions still required a user to manually connect a cable between a charging port of the vehicle and the charging system. The user would access the charging port and insert a plug into the charging port in order to connect the vehicle's charging system to the available power at the user's home. However, this takes time and a user may forget to do this procedure, only remembering the next day once the user discovers that the vehicle is not fully charged when they get in the vehicle. If the user is late, then there is no time to charge the vehicle, which can lead to dissatisfaction with electric vehicles generally compared to the fast re-fueling of ICE counterparts. Further, users directly handling the components of the charging system can expose users to risk of electrocution, which is especially dangerous with systems that use higher voltage to charge the electric vehicle in less time.

One solution that is being developed is to use automated charging systems that connect the vehicle's charging subsystem to a power supply automatically when the driver parks the vehicle in a designated spot. However, different vehicle manufacturers may locate the charging ports in different areas of the vehicle. Even different models from the same manufacturer may locate the charging ports in different locations. Some manufacturers may use proprietary charging ports on their vehicles, that require adapters to be used with standard plugs. Further, the driver may not park the vehicle in the exact same spot every time, meaning the location of the charging port of a single vehicle can vary day to day relative to a fixed location of the automated charging system in a particular parking spot. To address these issues, the automated charging system needs to be designed to robustly adapt to different conditions. However, cost of the system for the consumer is also a consideration and, as such, the system needs to be as simple as possible while also providing accurate, hands-free operations. Solutions to these issues are needed to help consumers adopt electric vehicle technology at low costs.

SUMMARY

An automated charging system is described in the following detailed description. The automated charging system includes a plug that is actuated by robotic control to insert the plug into a charging port of the vehicle. The plug includes a camera and a tapered structure.

A method for estimating localization of an object in an image relative to a position and orientation of a camera is also described in the following detailed description. The method can be performed by the automated charging system to control a position and/or orientation of the plug.

In accordance with one aspect of the present disclosure, a method for estimating localization of an object in an image relative to a position and orientation of a camera is described. The method includes: performing a gross localization procedure to estimate a target position in three-dimensional space based on a first image of the object captured by the camera; moving the camera based on the estimated target position; and performing a fine localization procedure to estimate a new target position and a target orientation in the three-dimensional space based on a second image of the object captured by the camera.

In some embodiments, the gross localization procedure includes processing the first image by a convolutional neural network configured to generate a three-element output vector that represents the target position for the camera in the three-dimensional space relative to a current position of the camera. In an embodiment, prior to performing the gross localization procedure, the convolutional neural network is trained based on a set of training data that includes a set of input images and corresponding target output vectors. In an embodiment, the three-element output vector includes a radial coordinate, an angular coordinate, and an azimuth coordinate.

In some embodiments, the fine localization procedure includes processing the second image by a convolutional neural network configured to generate an output vector with at least one position coordinate and at least one orientation coordinate. In an embodiment, the at least one position coordinate includes at least one of a radial coordinate, an angular coordinate, and a height coordinate. In addition, the at least one orientation coordinate includes an angular rotation coordinate associated with a corresponding axis.

In some embodiments, the gross localization procedure includes processing the first image by a neural network configured to perform object detection, wherein the output of the neural network comprises at least one of coordinates for a bounding box or a segmentation mask. In an embodiment, the gross localization procedure further includes processing the coordinates for the bounding box to calculate the estimated target position.

In some embodiments, the gross localization procedure includes processing the first image by a first convolutional neural network, and the fine localization procedure comprises processing the second image by a second convolutional neural network.

In some embodiments, the first convolutional neural network includes fewer convolution layers than the second convolutional neural network.

In some embodiments, the gross localization procedure is performed by a processor, and the fine localization procedure is performed by a machine learning (ML) accelerator connected to the processor. In an embodiment, the ML accelerator is configured to implement a convolutional neural network configured to generate an output vector that includes three position coordinates and at least one orientation coordinate.

In accordance with a second aspect of the present disclosure, a system is described that includes a camera assembly, a memory, and at least one processor coupled to the memory. The processor is configured to: perform a gross localization procedure to estimate a target position in three-dimensional space based on a first image of an object captured by the camera assembly; move the camera assembly based on the estimated target position; and perform a fine localization procedure to estimate a new target position and a target orientation in the three-dimensional space based on a second image of the object captured by the camera assembly.

In some embodiments, the gross localization procedure includes processing the first image by a first convolutional neural network configured to generate a three-element output vector that represents the target position for the camera in the three-dimensional space relative to a current position of the camera.

In some embodiments, the fine localization procedure includes processing the second image by a second convolutional neural network configured to generate an output vector with at least one position coordinate and at least one orientation coordinate.

In some embodiments, the system further includes a machine learning (ML) accelerator coupled to the at least one processor and configured to execute at least one of the first convolutional neural network or the second convolutional neural network.

In some embodiments, the camera assembly is mounted on a plug associated with a charging port of an electric vehicle, and wherein moving the camera assembly comprises generating signals for one or more actuators configured to move the plug in the three-dimensional space.

In accordance with a third aspect of the present disclosure, a non-transitory computer-readable storage medium is described. The computer-readable storage medium stores instructions that, when executed by a processor, cause the processor to: perform a gross localization procedure to estimate a target position in three-dimensional space based on a first image of an object captured by the camera assembly; move the camera assembly based on the estimated target position; and perform a fine localization procedure to estimate a new target position and a target orientation in the three-dimensional space based on a second image of the object captured by the camera assembly.

In some embodiments, the gross localization procedure includes processing the first image by a first convolutional neural network configured to generate a three-element output vector that represents the target position for the camera in the three-dimensional space relative to a current position of the camera.

In some embodiments, the fine localization procedure comprises processing the second image by a second convolutional neural network configured to generate an output vector with at least one position coordinate and at least one orientation coordinate.

DETAILED DESCRIPTION

The present disclosure is directed to an automated charging system for an electric vehicle. The automated charging system is configured to automatically insert a plug into a charging port of a vehicle when the vehicle is located in a charging bay, which may otherwise be referred to as a parking spot that includes the automated charging system. In an embodiment, the electric vehicle can signal the automated charging system to connect the plug to the charging port to begin charging the vehicle. The signal can be sent wirelessly via infrared signal or other wireless communication means such as via a wireless local area network.

The plug, which may be referred to as an end effector or the like, can include a camera located below the pins of the plug that provide alternating current (AC) power to the vehicle's charging system when the plug is inserted into the charging port. The camera captures images of the vehicle and/or charging port in order to provide feedback to the automated charging system that can be used to control the position and orientation of the plug. The plug can be actuated by robotic actuators to move relative to the charging port.

In some embodiments, the vehicle's charging port may include both AC and DC (direct current) connections for use with different charging systems. The automated charging system uses AC power to charge the vehicle and, as such, the DC pins of the vehicle's charging port may remain unused when the plug is connected to the charging port. As such, the camera on the plug can have an unobstructed view of the DC pins while the plug is inserted into the charging port, providing a closed-loop feedback to the control system of the automated charging system to indicate when the plug has been accurately inserted into the charging port. As the plug gets closer to the vehicle's charging port, the view of the DC pins in the charging port will get larger and the images captured by the camera can be analyzed to estimate a depth to which the plug has been inserted into the charging port.

In some embodiments, the plug can also incorporate one or more structures that can facilitate insertion of the plug into the charging port. In an embodiment, the plug includes at least one tapered structure that is designed to mate with the DC pin just before and/or during insertion. The force on the surface of the tapered structure can help to finely adjust a position of the plug relative to the charging port as the connection is completed. This fine-tuning by mechanical means allows for a much less accurate robotic control system to perform the insertion than would otherwise be required if 100% of the positioning were performed by robotic actuation of the plug in response to the camera feedback and/or other types of sensors such as encoders.

Figure 1:
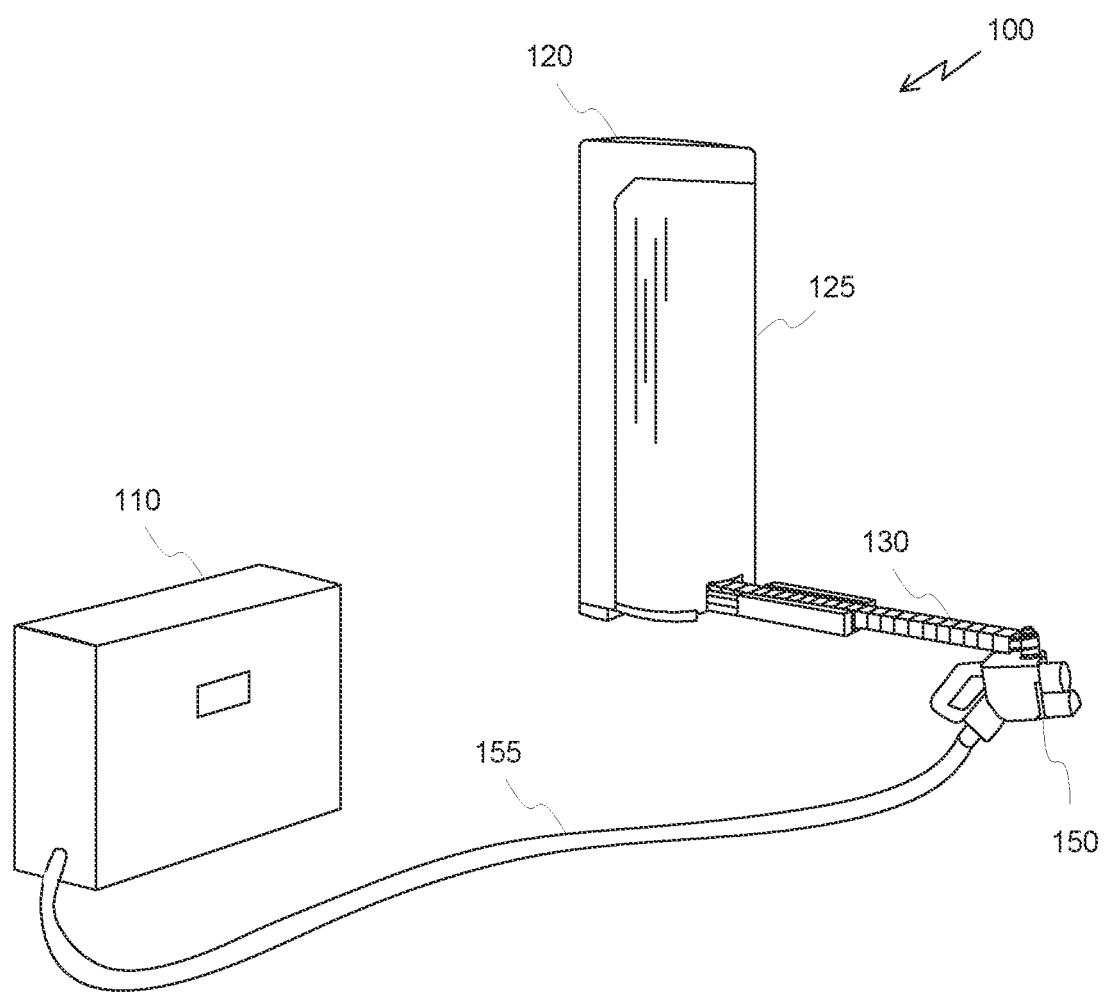
FIG. 1 illustrates an automated charging system for an electric vehicle, in accordance with some embodiments.

FIG. 1 illustrates an automated charging system 100 for an electric vehicle, in accordance with some embodiments. The automated charging system includes a power supply 110 and a chassis 120 that contains one or more actuators (not explicitly shown). The power supply 110 is typically connected to an electrical grid to supply AC power to the electric vehicle. In some embodiments, the power supply 110 can include additional electrical components and/or circuits such as line filters, transformers, circuit protection equipment (e.g., fuses and/or circuit breakers), batteries (to store excess power in cases the electrical grid fails), or the like. The power supply is connected to a plug 150 that has a form factor that is configured to mate with a charging port of an electric vehicle. A cable 155 provides electricity from the power supply 110 to the plug 150.

The plug 150 can be moved in three-dimensions relative to the vehicle. In an embodiment, the plug 150 is mounted to a rigid chain 130 comprising a number of links. A characteristic of the rigid chain 130 is that, in a straight configuration, the links provide a substantially rigid platform that can be extended in a radial direction from the chassis 120. In other words, the links are designed such that the surfaces of the links interfere and prevent a load at the end of the rigid chain 130 from deflecting towards the ground, to an extent. However, upon retraction, the links can rotate relative to adjacent links that allow the rigid chain 130 to be stowed inside the chassis 120 in an efficient manner that reduces a space requirement of the automated charging system 100. It will be appreciated that the rigid chain 130 is not absolutely rigid and that tolerances in the links allow for some degree of deflection at the end of the rigid chain 130.

In some embodiments, the chassis 120 houses a number of actuators that can be configured to move the plug 150. For example, a first actuator can be configured to extend or retract the rigid chain 130 from the chassis 120 in order to move the plug in a radial direction. A second actuator can be configured to rotate the rigid chain around a vertical axis proximate the center of a cylindrical cover 125 that protects the actuators and other components inside the chassis 120. A third actuator can move the rigid chain along a direction of the vertical axis. The three actuators, therefore, correspond to cylindrical coordinates $<\rho, \varphi, z>$, where $\rho$ corresponds to a radial coordinate, $\varphi$ corresponds to an angular coordinate, and z corresponds to a height coordinate. In another embodiment, the third actuator can rotate the chain in an azimuth direction (i.e., relative to a horizontal plane parallel with the surface of the charging bay. In such embodiments, the three actuators correspond to spherical coordinates $<\rho, \varphi, \theta>$, where $\rho$ corresponds to a radial coordinate, $\varphi$ corresponds to an angular coordinate, and $\theta$ corresponds to an azimuth coordinate. It will be appreciated that the choice of cylindrical or spherical coordinates may depend on the type of actuator (e.g., linear or angular) that is designed into the system 100.

In addition to the three actuators configured to move the position of the plug 150 in three-dimensions, one or more additional actuators can be configured to orient the plug 150 at the end of the rigid chain 130. In an embodiment, a fourth actuator rotates the plug 150 in a plane parallel to the floor of the charging bay. In some embodiments, the automated charging system 100 may include a fifth actuator that rotates the plug 150 around a radial axis that extends along the direction of extension of the rigid chain 130 and/or a sixth actuator that rotates the plug around an axis orthogonal to the radial axis and parallel with the floor of the charging bay. In such cases, the plug 150 may have 5 or 6 degrees of freedom.

Each of the actuators may include sensors, such as optical encoders, limit switches, or the like, that provide feedback to a controller that indicates the position of the plug 150 relative to the chassis 120. The controller may include electronics for sensing a location of the charging port of the electric vehicle and transmitting signals to each of the actuators to move the position of the plug 150.

It will be appreciated that the automated charging system 100 described in FIG. 1 is only one example embodiment of a robotic system configured to insert the plug 150 into a corresponding charging port of an electric vehicle. In other embodiments, the design of the robotics system, including number and type of actuators, degrees of freedom, control system, and the like can vary. For example, instead of actuators that can rotate the rigid chain 130 around a vertical axis, the robotics system may include linear actuators that move gantries in multiple dimensions. As another example, a robotic arm can include a number of linkages that can rotate around an axis defined by the orientation of the corresponding linkage. By rotating a combination of the linkages, the position of the end effector of the robotic arm can move in three dimensions. It will be appreciated that other types of robotic systems that can be controlled to insert a plug into a charging port are within the scope of the present disclosure.

Figure 2:
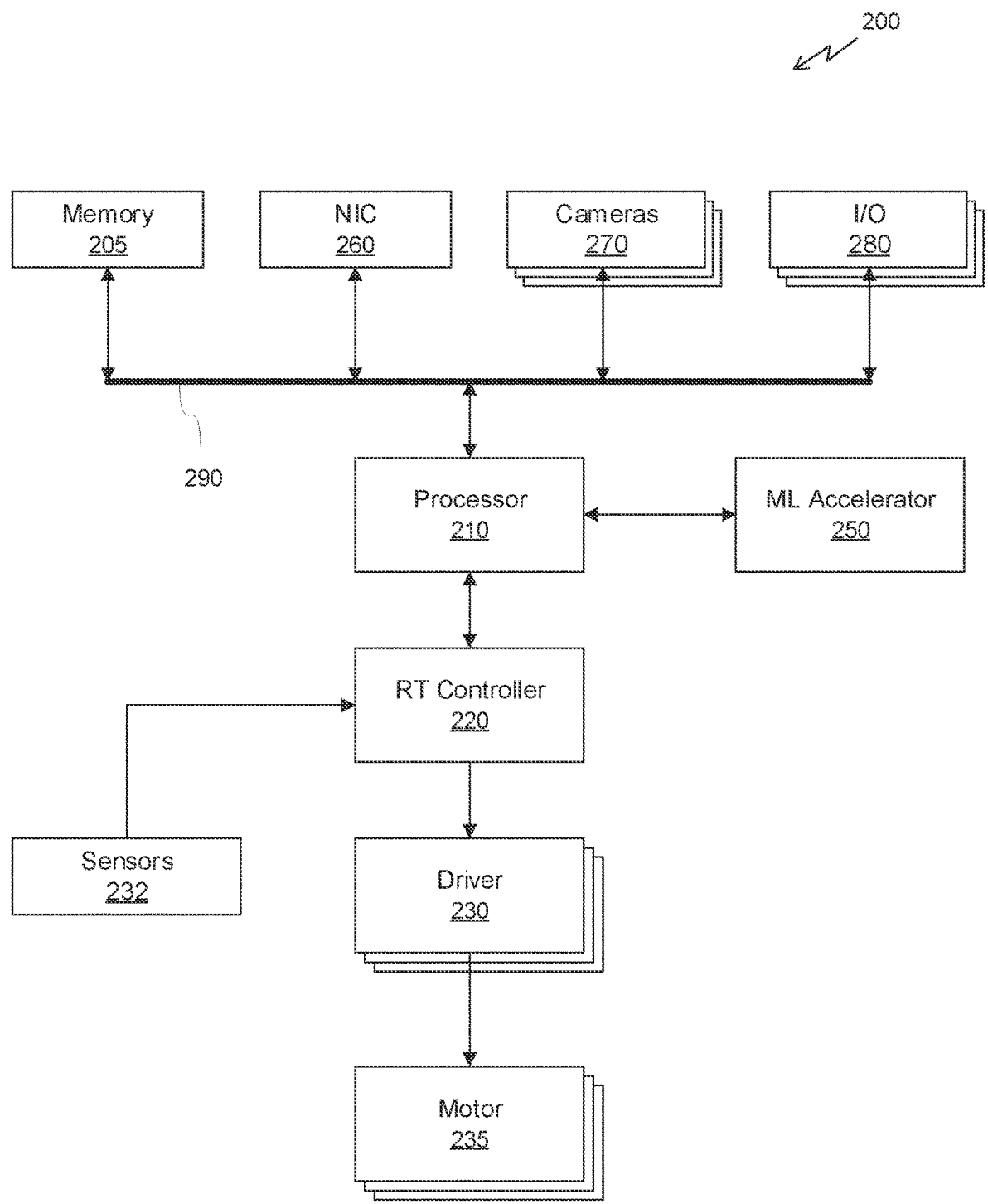
FIG. 2 is a schematic diagram of the automated charging system, in accordance with some embodiments.

FIG. 2 is a schematic diagram of a control system 200 for the automated charging system 100 of FIG. 1, in accordance with some embodiments. The control system 200 is designed to drive the actuators that control the location of the plug 150 relative to the charging port of the electric vehicle. The control system 200 may include one or more microcontrollers, processors (e.g., CPU, GPU, DSP, SoCs, ARM cores, etc.), programmable logic controllers, and the like configured to execute instructions and generate signals. The instructions can be stored in a non-transitory computer readable medium such as a non-volatile memory (e.g., HDD, SSD, Flash memory, or the like). The control system 200 can include interfaces for inputs and outputs (I/O) for receiving signals from one or more sensors and transmitting signals to one or more actuators or other external components. While the control system 200 shown in FIG. 2 is an exemplary control system for carrying out the techniques described herein, it will be appreciated that any control system including components in addition to or in lieu of those shown in FIG. 2 are within the scope of the disclosure.

As depicted in FIG. 2, the control system 200 includes a processor 210 connected to a real-time controller (RTC) 220. The processor may be a central processing unit (CPU) such as an Intel x86 CPU or may be an embedded microcontroller that includes a reduced instruction set computer (RISC) core. The processor 210 can be multi-threaded and include one or more cores that enable the processor 210 to execute different processes in parallel. In an embodiment, the processor 210 is connected to a memory 205 via a system bus 290. The memory 205 is may be a volatile memory such as a dynamic random access memory (DRAM). In an embodiment, the processor 210 and the memory 205 are included in a single package referred to as a package-on-package (POP) or in a system-on-a-chip (SoC). In other embodiments, the processor 210 and the memory 205 are included in separate packages and connected via interconnects formed on a printed circuit board (PCB).

Conventional processors are typically not programmed to execute programs in real-time. In some cases, an operating system will stall a program for significant time (tens or even hundreds of milliseconds) while background processes are performed by the operating system. Furthermore, where a program relies on data stored in an external memory, such as memory 205, delays in loading the data may cause a program to stall, especially where the memory 205 can be accessed by several different components. The RTC 220 is a device that operates in accordance with stricter time constraints. For example, the RTC 220 may only allow for one or two processes to run in parallel, and each process is guaranteed a certain amount of execution time during each processing period (e.g., 1 ms). By simplifying the programs that are designed to run on the RTC 220, and potentially limiting the types of instructions that can be executed by the RTC 220, the expected functions controlled by the RTC 220 can be expected to executed at a particular frequency.

In practice, the RTC 220 is used to drive the actuators for controlling the position of the plug 150, while the processor 210 is used to instruct the RTC 220 a target position of the plug 150. The RTC 220 may generate signals for each of the one or more actuators. In this case, each actuator corresponds to a motor driver 230 connected to a motor 235. The motor driver 230 includes electrical components that isolate the control signal (i.e., a low current signal of low voltage) from the load current (i.e., higher current and higher voltage) for the motors 235. The Motors 235 can be AC or DC motors and/or stepper motors. In some embodiments, the actuators can include other types of devices including pneumatic or hydraulic cylinders, linear actuators, or the like.

In some embodiments, the RTC 220 receives signals from sensors 232 that are used in feedback of a closed-loop system. For example, the sensors 232 can include optical encoders (e.g., quadrature encoders) that indicate a position of a corresponding motor axis. The RTC 220 can implement a proportional-integral-derivative (PID) control algorithm to generate a signal that is proportional to the error between the position indicated by the feedback signal and the target position received from the processor 210. In other embodiments, the RTC 220 can implement an open-loop system, such as by outputting a signal for a stepper motor that assumes the motor advances in accordance with the signal without any feedback from an encoder. Such embodiments may be cheaper to implement but can be unreliable when unexpected things happen, such as encountering an obstruction that causes the stepper motor to miss steps.

The processor 210 can also be connected to additional components via the system bus 290. For example, the control system 200 can include a network interface controller (NIC) 260, one or more cameras 270, and additional sensors 280. The NIC 260 can implement a wired or wireless interface, such as wired Ethernet or IEEE 802.11 wireless interfaces. The NIC 260 can allow the automated charging system 100 to communicate over a network (e.g., a local area network) or via an ad hoc point-to-point connection. For example, the NIC 260 may enable the automated charging system 100 to communicate with a terminal device such as a user's phone to transmit signals indicating a state of charge of the electric vehicle during charging.

The camera(s) 270 can be used to capture images of the charging bay in order to provide feedback that can be used by the processor 210. For example, a camera 270 mounted on the chassis 120 can be used to take an image of the charging bay in order to detect the presence of an electric vehicle. In some embodiments, the camera 270 can be configured to capture an image periodically (e.g., every 30 seconds) to determine whether a vehicle has entered the charging bay. In some cases, the image can be analyzed to determine a classification of the vehicle and/or a position and orientation of the vehicle. As another example, a camera 270 mounted on or proximate to the plug 150 can be used to capture an image directly in front of the plug 150. Such images can be used to determine a location of a charging port on the electric vehicle. These images can also be used to estimate a relative position between the plug 150 and the charging port in order to change a target location for the plug 150 to effectuate insertion of the plug 150 into the charging port, as will be discussed in more detail below.

The additional sensors 280 can include, but are not limited to, limit switches, current sensors, Hall effect sensors, and the like. These additional sensors can, among other functions, detect a home position of one or more axes, detect whether the electric vehicle is being charged properly, or provide other types of feedback that may be used by the processor 210.

In some embodiments, the processes implemented by the processor 210 can incorporate various artificial intelligence (AI) functionality. For example, images captured by the cameras 270 can be analyzed using neural networks such as a convolutional neural network (CNN), a recurrent neural network (RNN), or the like. In one embodiment, an image of the charging bay can be analyzed by a neural network configured to detect a type of electric vehicle in the charging bay. The neural network can be referred to as a classifier and returns an output of the neural network that indicates whether the electric vehicle is one of a plurality of different models. For example, the neural network may be capable of determining whether the electric vehicle is a Tesla™ model S or a Nissan™ Leaf.

In some embodiments, the processor 210 is configured to analyze the image by implementing the neural network. For example, in the case of a CNN, the processor 210 can be configured to apply a filter kernel (e.g., a convolution filter) to a set of activations based on the image. The outputs of the filter define a new set of activations. Each layer of the neural network can implement a separate filter kernel that is designed to filter the activations from a previous layer, and the structure of the CNN can have multiple layers. The CNN can also include pooling layers and fully-connected layers that are configured, via various parameters, to generate the output of the CNN, which can be a vector having values that indicate the confidence that the image includes a vehicle of a particular type.

Various image processing algorithms that utilize neural networks are well-known to those of skill in the art. In some embodiments, the control system 200 includes a machine learning (ML) accelerator 250 that is coupled to the processor 210. In an embodiment, the ML accelerator 250 is a parallel processing unit such as a graphics processing unit (GPU), vector processing unit (VPU), tensor processing unit (TPU), or the like. The ML accelerator 250 may be better suited to execute a large number of similar operations on different data in parallel, thereby speeding up the execution of the ML algorithm compared to executing said algorithm on the processor 210. Thus, the processor 210 may direct the ML accelerator 250 to process an image by a ML algorithm such as a CNN. The ML accelerator 250 may then transmit a result of the ML algorithm back to the processor 210 for further processing. The processor 210 may then use the output of the classifier network to, e.g., determine an expected location of the charging port on that particular electric vehicle. The expected location may then be used to position the plug 150 in an area that is expected to be close to the charging port in order to insert the plug 150 into the charging port via additional feedback from other sensors 232/cameras 270.

Although the ML accelerator 250 may be described in terms of implementing a neural network, in other embodiments, the ML accelerator 250 can implement any ML algorithm or conventional algorithm (e.g., image processing algorithm) that is technically feasible and that can be off-loaded from the processor 210 to the ML accelerator 250.

Figure 3:
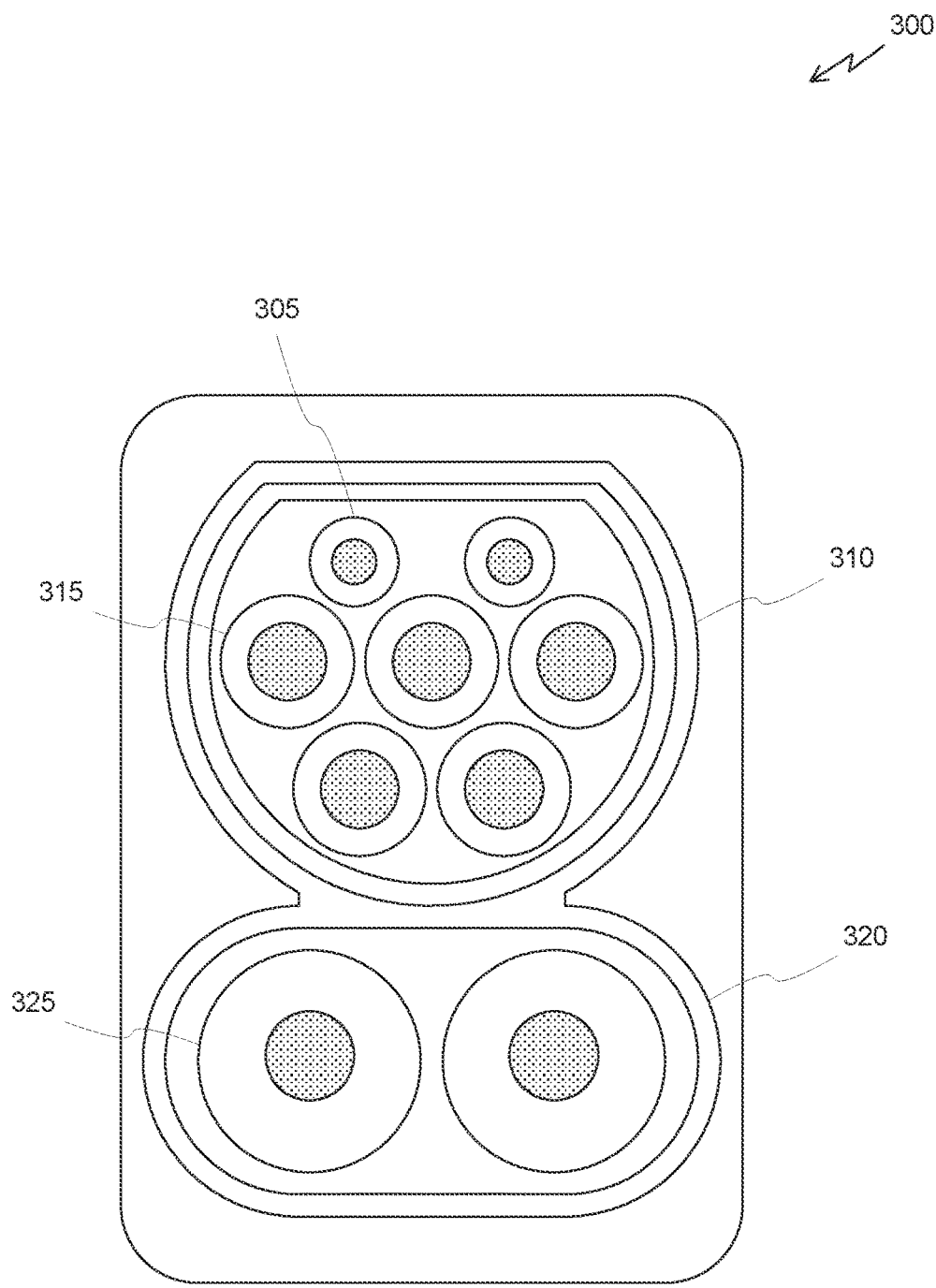
FIG. 3 illustrates a charging port of an electric vehicle, in accordance with an embodiment.

FIG. 3 illustrates a charging port 300 of an electric vehicle, in accordance with an embodiment. The charging port 300 may be referred to as a combined charging system (CCS) socket and is designed to mate with a corresponding plug. The charging port 300 may include a socket that complies with a Society of Automotive Engineers (SAE) J1772 standard for AC charging as well as provide additional sockets for fast DC charging.

As shown in FIG. 3, the charging port 300 includes two distinct charging receptacles, a first receptacle 310 for use with AC charging and a second receptacle 320 for use with DC charging. The electric vehicle's charging system may be designed to charge the storage system (e.g., batteries) of the electric vehicle using either AC or DC power. The standard pinout provides two pins 305 that provide proximity pilot (i.e., pre-insertion signaling) and control pilot (i.e., post-insertion signaling) for indicating when the plug is nearly inserted or fully inserted, respectively. The five AC pins 315 include three-phase AC line inputs plus AC neutral and earth ground signals for connecting a three-phase AC power source. If single phase power is used, then only one of the line inputs may be connected. The two DC pins 325 include a line and neutral pin for connecting a DC power source.

It will be appreciated that the charging port 300, while standard in North America, may not be used in other regions of the world, may be superseded by a new socket design, or may be replaced by a proprietary socket by particular manufacturers. However, the techniques disclosed below may be applied to other types of charging ports sharing characteristics that are similar to the charging port 300, such as both AC and DC charging pins and/or a negative space surrounding the conductive pins.

Figure 4A:
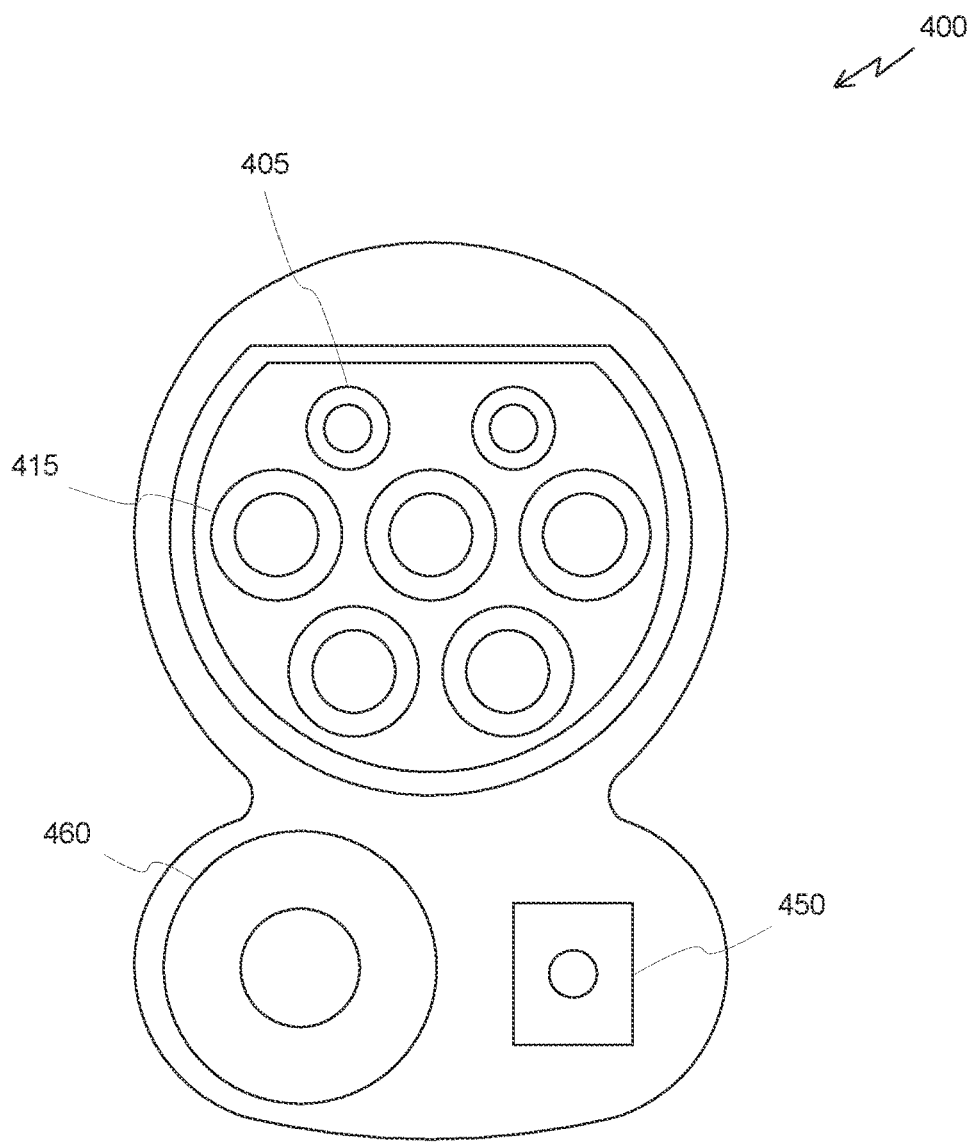
FIGS. 4A-4B illustrates a plug configured to be inserted into the charging port, in accordance with one embodiment.
Figure 4B:
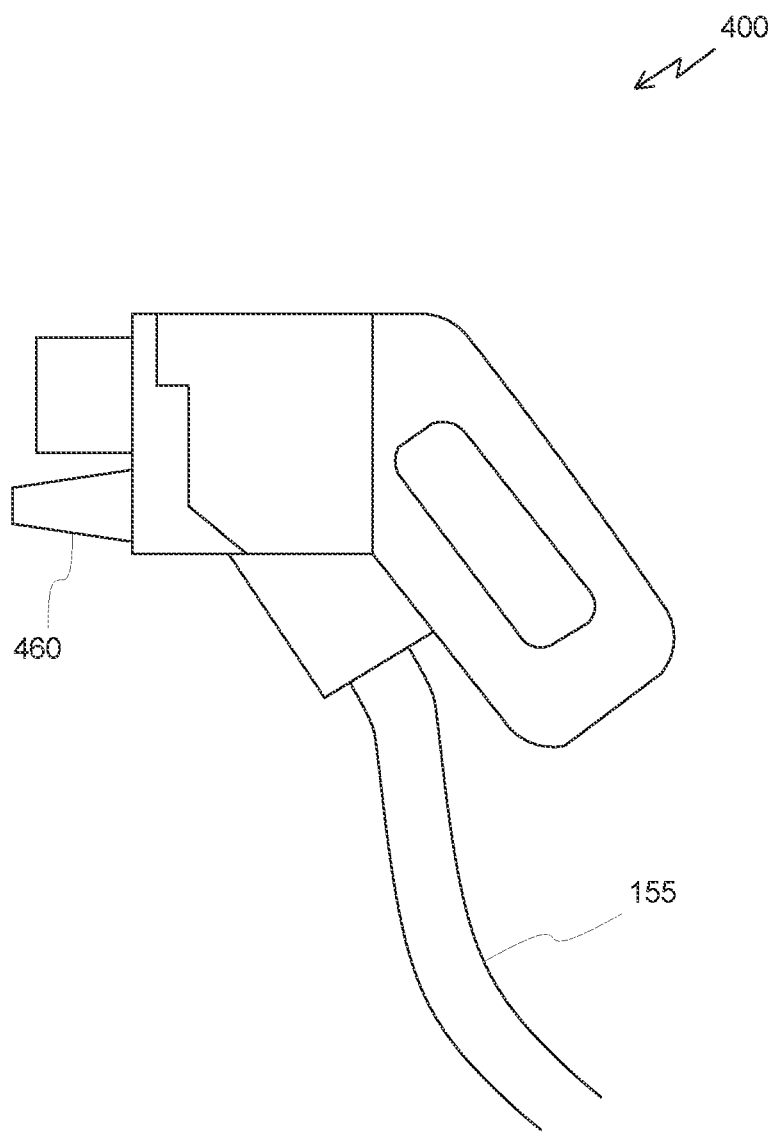

FIGS. 4A-4B illustrate a plug 400 configured to be inserted into the charging port, in accordance with some embodiments. The plug 400 can replace plug 150 in the automated charging system 100. As depicted in FIG. 4A, the plug 400 includes two sockets 405 for the proximity pilot and the control pilot pins 305 of the charging port 300. The plug 400 also includes five AC sockets 415 that correspond to the three-phase AC line inputs, AC neutral, and earth ground signals. The plug 400 does not include corresponding sockets for the DC pins 325, as the plug 400 is configured to only Level 1 or Level 2 AC charging capabilities.

In an embodiment, instead of including DC sockets, the plug 400 includes a camera assembly 450 and a tapered structure 460. The camera assembly 450 can include an image sensor (e.g., CMOS image sensors, CCD image sensor, etc.), a lens, filters, and the like. In some embodiments, the camera assembly 450 includes movable components that enable optical zoom or focus adjust capability. In other embodiments, the focus of the camera assembly 450 is fixed. The camera assembly 450 is configured to capture images of the environment in front of the plug 400.

In an embodiment, the camera assembly 450 also includes an infrared (IR) light source (not explicitly shown) that allows the charging bay and/or electric vehicle to be illuminated with IR light rather than relying on ambient light for illumination. The camera assembly 450 may include an IR filter such that the image sensor captures reflected light from the IR light source. Relying on images from the IR light source may alleviate issues from reflections of sunlight or other issues due to varying lighting conditions.

In some embodiments, the plug 400 may include two offset camera assemblies. The two camera assemblies can capture a stereoscopic image (i.e., a left and a right image). In an embodiment, a disparity between objects (in pixels or sub-pixel units) can be calculated for each pixel of the left or right image with a corresponding pixel for that object in the other image. The disparity can be used to estimate a distance to the object, with large disparities correlating with smaller distances. In some embodiments, a neural network can be trained to process the image to estimate the disparity value for each pixel of one of the left or right images. The processor 210 can then estimate the relative distance to an object based on the disparity values. However, it will be appreciated that multiple camera assemblies may increase the overall cost of the system, which might be undesirable where reducing costs is an important aspect of the system. Thus, other embodiments, may process monocular images based on other object recognition algorithms or neural network models.

In an embodiment, the tapered structure 460 is designed to interface with a corresponding DC pin 325. The tapered structure 460 may be made of a dielectric material that electrically isolates the plug from the DC pin 325. The tapered structure 460 is shown in side profile view in FIG. 4B, and a tip of the tapered structure 460 may extend beyond a front surface of the sockets 405/415. The tapered structure 460 is designed to fit over the pin and contact a cylindrical surface that surrounds the DC pin 325. The outer surface of the tapered structure 460 is tapered such that a radius of the tip of the tapered structure 460 is smaller than the radius of the cylindrical surface surrounding the DC pin 325. A radius of the base of the tapered structure 460 is the same radius of the cylindrical surface or slightly larger than the radius of the cylindrical surface such that, when the plug is fully inserted into the charging port 300, the radius of the tapered surface at a contact point on the edge of the cylindrical surface that surrounds the DC pin 325 is equal or slightly smaller to the radius of the cylindrical surface. Of course, in some embodiments, the radius of the base of the tapered structure may be smaller than the radius of the cylindrical surface. However, in such cases, the ability to locate the plug will be less accurate, and the accuracy may be related to the difference in radii between the base of the tapered structure and the cylindrical surface.

The tapered structure 460 is designed to allow for less accurate positioning of the plug by the robotics system such that a mechanical interference between the tapered surface and the DC pin 325 will effect fine adjustments in position and/or orientation of the plug 400. It will be recognized that not all charging ports include both the AC connections and the DC connections. Some charging ports may not include the DC fast charging pins. In an embodiment, the tapered structure 460 may be spring loaded and capable of retracting into the body of the plug 400. The spring applies a pressure against the tapered structure 460 to extend the tapered structure from the body. Upon contact with an object, such as a surface where the DC pins would normally be located, the force of the spring may be overcome by the force of the actuators moving the plug forward, thus pushing the tapered structure 460 into the body of the plug. Thus, if the tapered structure 460 hits a surface other than the intended cylindrical surface surrounding the DC pin 325, then the tapered structure 460 will be pushed back into the body of the plug 400, allowing the plug 400 to be fully inserted into a corresponding AC charging port.

In operation, the camera assembly 450 captures images of the charging port 300 on an electric vehicle. The control system 200 can analyze the images to register a position and/or orientation of the plug 400 relative to the charging port 300. For example, in an embodiment, the ML accelerator 250 may process the image to estimate a distance from the camera assembly 450 to each of the two DC pins 325 of the charging port 300. The processor 210 then takes the output of the ML accelerator 250 and calculates different setpoints for the one or more actuators to move the plug 400 into position to insert the plug 400 into charging port 300. In some embodiments, the processor may follow a path that moves the plug 400 from a home position proximate the chassis 120 through a number of waypoints between the home position and the charging port 300. For example, a first image can be captured that determines approximately where the charging port 300 is located based on where the electric vehicle is parked relative to the chassis 120. This image can be captured by the camera assembly 450 or a separate camera located on the chassis 120 or in any other location. The control system 200 then positions the plug in front of the charging port 300 but at a distance sufficient to where fine adjustments can be made during the actual insertion of the plug 400. Additional waypoints may then be set between this initial position and the final insertion position, with a new image captured periodically to adjust the signals to the actuators to make fine adjustments as the plug 400 is moved. Again, in order to decrease a cost and complexity of the automated charging system 100, the actuators may rely on the closed-loop feedback from the camera assembly 450 and/or the mechanical assistance from the tapered structure 460 such that accurate open-loop positioning based only on the robotics system is not crucial for effective mating of the plug 400 and the charging port 300.

As shown in FIG. 4A, the camera assembly 450 is positioned such that the camera captures images of at least one DC pin 325 all the way through insertion. This allows the camera assembly 450 to capture images that can be used for closed-loop feedback during the entire insertion procedure rather than relying on open-loop control during a final portion of the insertion procedure because the view of the camera is blocked by the sockets being inserted into the charging port 300.

Figure 5:
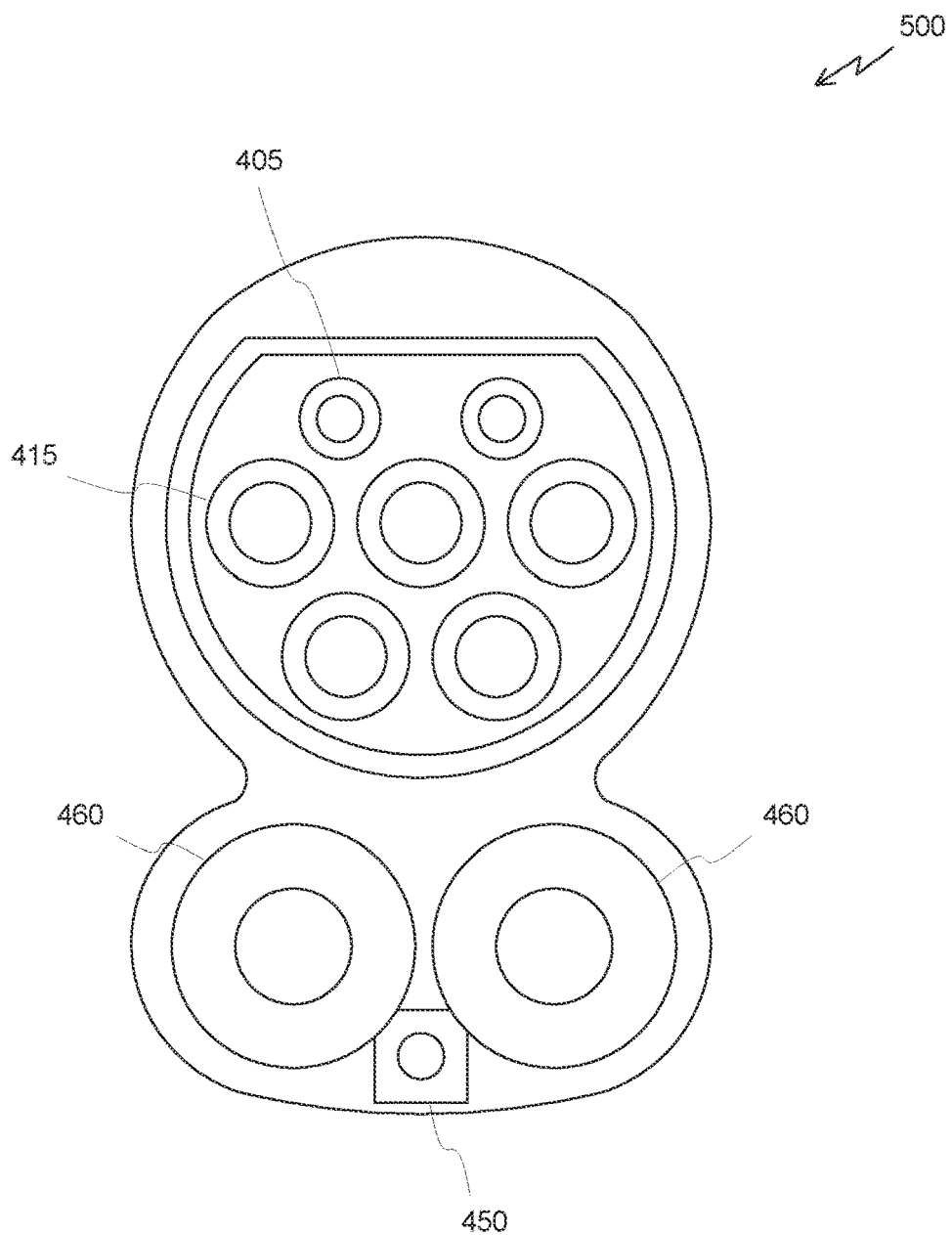
FIG. 5 illustrates a plug configured to be inserted into the charging port, in accordance with another embodiment.

FIG. 5 illustrates a plug 500 configured to be inserted into the charging port, in accordance with another embodiment. As depicted in FIG. 5, in another embodiment, the plug 500 includes a pair of tapered structures 460 that are designed to mate with the two DC pins 325. The camera assembly 450 is then relocated between the tapered structures 460. Having two tapered structures 460 can promote alignment and rotation of the plug 500. It will be appreciated that the tapered structures 460 may block the view of the DC pins from the camera assembly 450 during a final portion of the motion. As such, in some embodiments, a surface of the charging port 300 can include a marking or other structure at a location that is visible to the camera assembly 450 during this final portion of the motion and the processor 210 can be configured to key off this location for closed-loop feedback during this last step of the procedure. For example, IR reflective crosshairs can be painted or adhered to the charging port that can be measured, i.e., by counting a number of pixels for the length of each side of the crosshairs, to estimate a distance until the insertion is complete.

Although the plugs 400 and 500 have been described as including the AC sockets 415 and placing the camera assembly 450 and tapered structure(s) 460 at a location corresponding to the DC pins of the charging port 300, in other embodiments, the plug can be designed for fast DC charging by including corresponding DC sockets and omitting the AC sockets 415. The camera assembly 450 and tapered structure(s) 460 would then be located above the DC sockets and register a location based off images and the estimated location(s) of the AC pins 305 included in the charging port 300. In yet other embodiments, a plug can be designed that includes both the AC sockets and DC sockets, where the camera assembly 450 and tapered structure(s) 460 are relocated to a different location on the plug body and configured to interact with additional surfaces or structures of a proprietary charging port that is modified from the charging port 300 shown in FIG. 3. For example, the charging port 300 can be modified to include a separate hole (not including a corresponding pin) for the tapered structure 460 and the camera can be positioned to capture images of a separate structure or marking proximate the AC pins 315 or DC pins 325.

Figure 6:
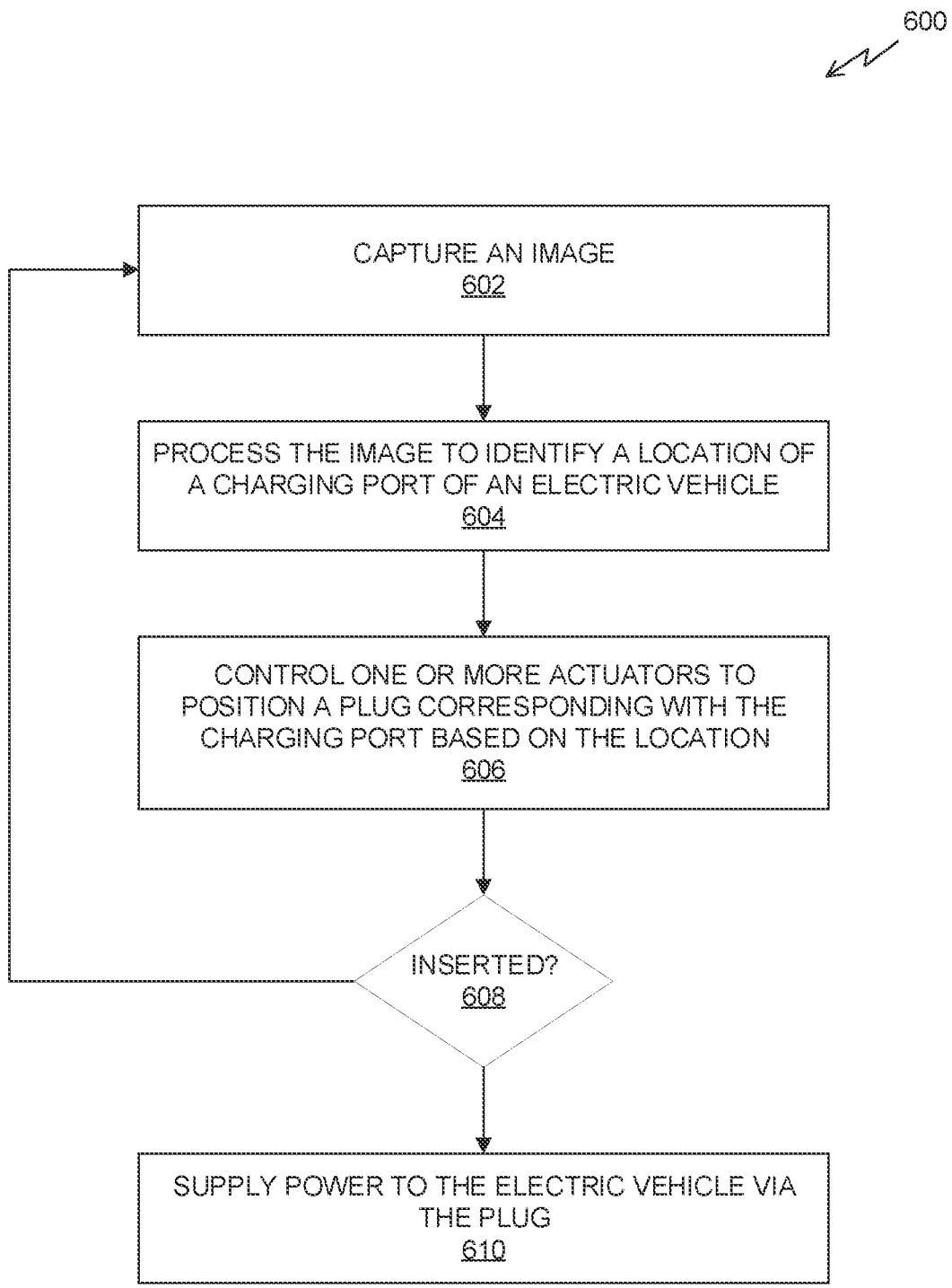
FIG. 6 is a flow diagram of a method for inserting the plug into the charging port of an electric vehicle, in accordance with some embodiments.

FIG. 6 is a flow diagram of a method 600 for inserting the plug into the charging port of an electric vehicle, in accordance with some embodiments. The method 600 can be performed by the automated charging system 100. In some embodiments, the steps detailed below can be implemented by one or more of the processor 210, the RTC 220, and/or the ML accelerator 250. In an embodiment, the memory 205 stores instructions that, when executed by one or more of the processor 210, the RTC 220, and/or the ML accelerator 250, causes the automated charging system 100 to implement one or more steps detailed below.

At step 602, an image is captured. In an embodiment, the camera assembly 450 captures an image using an image sensor. The image may be transmitted to a processor 210 for analysis. In one embodiment, the plug 400 includes a wired interface that is connected to the processor 210 via a system bus 290, and the camera assembly 450 is included in the control system 200 as camera 270. In another embodiment, the plug 400 includes a wireless chip and transceiver, and the camera assembly 450 is configured to transmit the image wirelessly to processor 210 via NIC 260. For example, the control system 200 can establish an access point for a wireless LAN, and the plug can be configured to connect to the access point to transmit the image to the processor 210. The image can be stored in memory 205 and then read from the memory 205 by the processor 210.

At step 604, the image is processed to identify a location of a charging port of an electric vehicle. In an embodiment, the processor applies one or more algorithms to process the image. In an embodiment, an object recognition algorithm is applied to the image to identify the type or model of electric vehicle in the charging bay that is visible in the image. Once the type or model of electric vehicle is identified, the processor 210 can look up information including a location and/or type of charging port for that electric vehicle. The processor 210 can then estimate an approximate location of the charging port based on the location of the electric vehicle. Alternatively, the processor 210 can perform a refined search of the image to locate the charging port on the electric vehicle. In an embodiment, different electric vehicles may include different types of charging ports, and the processor 210 can be configured to apply different algorithms to the image based on the type of charging port associated with the electric vehicle.

For example, the processor 210 can be configured to process the image using a CNN executed by the ML accelerator 250. However, the parameters of the CNN (e.g., weights and biases associated with each of a plurality of layers of the CNN) can be different for different trained versions of the CNN, where each trained version of the CNN is trained using training data associated with a particular type of charging port. These different CNNs can then be applied to the image to increase the accuracy of the inference process.

It will be appreciated that the processing in step 604 may include any number of steps or algorithms, executed sequentially or in parallel on one or more processors, in order to generate the estimated location of the charging port on the electric vehicle. Conventional and ML-based algorithms may be executed during step 604, either alone or in combination.

At step 606, one or more actuators are controlled to position a plug based on the location. The plug may correspond to the charging port and include at least one connection for providing power to the electric vehicle. In an embodiment, the plug 400/500 is controlled in position and/or orientation relative to the charging port by at least three actuators. In some embodiments, four or more actuators are controlled to position the plug at a location in space and rotate the plug around one or more axes at the end of an effector arm. In some embodiments, the effector arm comprises a rigid chain that includes a plurality of links, wherein the cable can be extended or retracted from a chassis to increase or decrease a distance of the plug, radially, from the chassis.

At step 608, insertion of the plug is monitored. In an embodiment, the processor 210 monitors one or more signals corresponding to the plug to determine whether the plug is fully inserted. The signals can include the proximity pilot and/or the control pilot signal from a standard J plug interface implemented by the plug. In another embodiment, the processor 210 can be configured to process an image captured by the camera assembly 450 in order to determine whether the plug is fully inserted into the charging port. It will be appreciated that the size of the features of the charging port in the image will change as the distance between the plug and the charging port decreases. Thus, the size of such features can be used to determine whether the plug is fully seated in the charging port.

If, at step 608, the plug is not fully inserted into the charging port, then the method 600 returns to step 602 and repeats steps 602-608 to reposition the plug. However, if the plug is fully inserted, then the method proceeds to step 610 where power is supplied to the electric vehicle via the plug. In an embodiment, the processor 210 causes the power supply 110 to connect an AC power source to the plug via a relay or other electrical component. By only activating the plug once the plug is fully inserted, a chance of accidental electrocution can be reduced.

Again, the process for locating and inserting the plug into the charging port should be optimized for minimal processing overhead to function on, e.g., and embedded platform and be cost effective. In some embodiments, the automated charging system 100 utilizes a single camera 270, mounted on the distal end of the effector arm (e.g., rigid chain 130), for controlling the entire range of motion of the plug 400, which can reduce the overall cost of the automated charging system 100. However, the size and resolution of the charging port when the camera is far away from the electric vehicle may make it more difficult for the algorithms to determine a position and/or orientation of the charging port.

For example, the pixel footprint of the charging port in the captured image may be much smaller when the plug is in a home position than the pixel footprint of the charging port when the plug is directly in front of the charging port ready to be inserted. The smaller pixel footprint makes any measurement of dimension of the features of the charging port less accurate, especially when trying to estimate an angle between the charging port and the camera, as small changes in angle can have an even smaller effect on the size of the features in the image. In contrast, when the camera is close to the charging port, the pixel footprint is larger and the dimensions of the features can be more accurately accessed.

In some embodiments, the processing of the image performed by the control system 200 can be split into a multi-stage process comprising a gross localization procedure and a fine localization procedure. Each stage of the multi-stage process can utilize different algorithms for processing the images from the camera assembly 450, which may provide for more accurate results as well as simpler processing.

Figure 7:
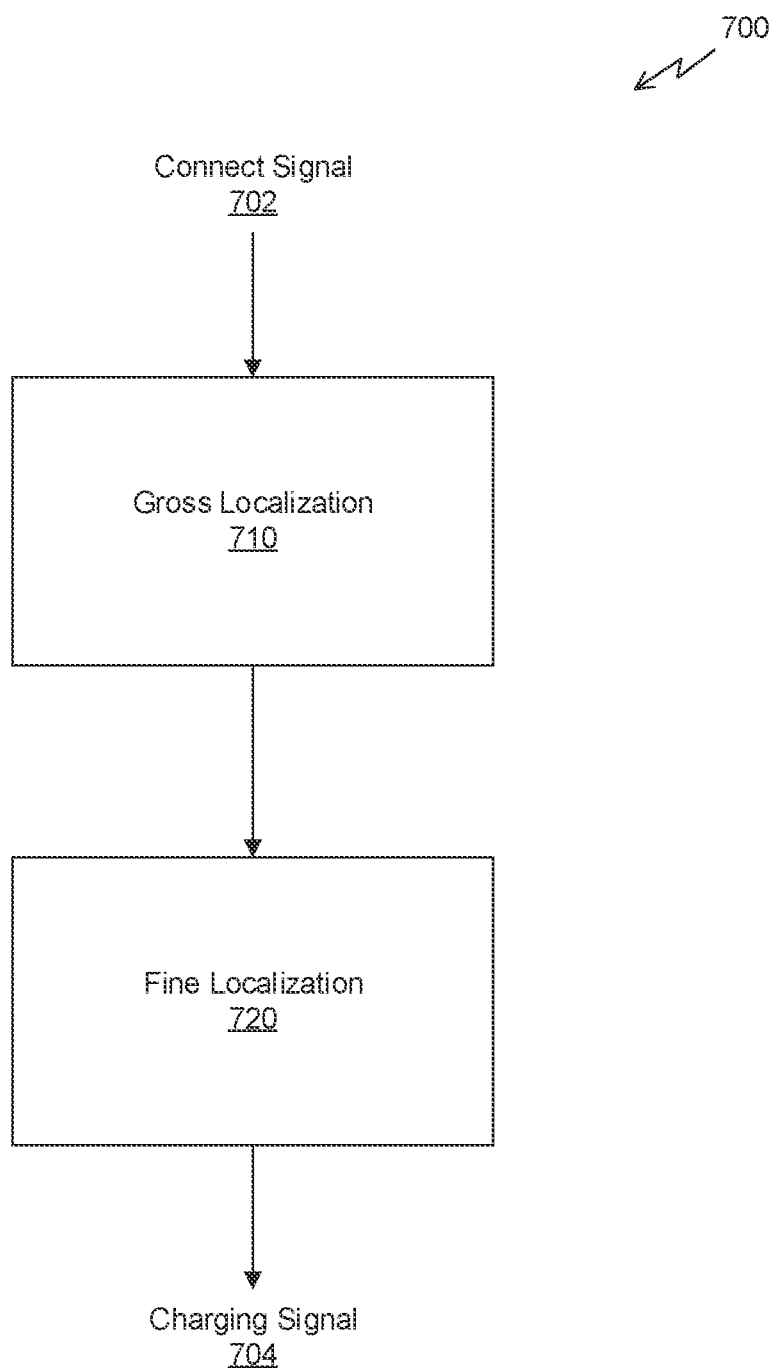
FIG. 7 is a conceptual diagram of a multi-stage localization architecture for positioning the plug, in accordance with some embodiments.

FIG. 7 is a conceptual diagram of a multi-stage localization architecture 700 for positioning the plug, in accordance with some embodiments. As depicted in FIG. 7, the automated charging system 100 receives a connect signal 702 from the electric vehicle. The connect signal 702 can be received at a wireless interface of the control system 100, either by NIC 260 or a separate IR module or near-field communication (NFC) (e.g., Bluetooth) interface.

The connect signal 702 causes the control system 200 to enter a gross localization stage 710. In an embodiment, the plug 400 is located at a home position at the beginning of the gross localization stage 710. The home position can be defined as a location such as with the rigid chain 130 fully retracted into the chassis such that the plug 400 is proximate the cylindrical cover 125. The home position may be at a location that gives the camera assembly 450 a largest view of the charging bay, although the home position can be defined anywhere that the camera assembly can capture an image of the electric vehicle to begin a gross localization procedure or a stowed position (such as fully retracted and/or rotated against a wall) that even obstructs the camera's view. In the case where the home position is a stowed position, any initiation of the gross localization stage 710 can begin with an initialization routine that moves the camera to a location or across a sweep of locations that enables the camera to have a view of the electric vehicle.

The gross localization procedure begins by capturing an image via the camera assembly 450. The image is transmitted to the control system 200 for processing. The gross localization stage 710 is configured to apply a rough three degree of freedom registration algorithm that estimates a location of the charging port of the electric vehicle in a three dimensional space. In other words, the gross localization procedure comprises an algorithm to estimate the position of the charging port but not the orientation of the charging port relative to the plug 400.

The algorithm can include a two-dimensional object detection algorithm, a semantic segmentation algorithm, an instance segmentation algorithm, or a neural network model trained for three degrees of freedom registration. These algorithms can account for spatial and environmental variance allowing for easier registration at a cost of precision and accuracy. These algorithms may also be easier to execute on less complex hardware, such as the processor 210.

It will be appreciated that the gross localization procedure may position the plug 400 proximate the charging port 300, but these algorithms are not capable of accurately estimating an orientation of the charging port 300 relative to the plug 400. Consequently, if the automated charging system 100 were to attempt to insert the plug 400 into the charging port 300 using only gross localization, the attempt may fail due to a misalignment of the pins with the sockets.

Consequently, once the plug 400 is positioned close to the charging port 300, the process switches to a fine localization stage 720. In an embodiment, the fine localization procedure begins by capturing an image via the camera assembly 450. The image is transmitted to the control system 200 for processing. The fine localization stage 720 is configured to apply a fine six degree of freedom registration algorithm that estimates a location and orientation of the charging port of the electric vehicle in a three dimensional space. In other words, the fine localization procedure comprises an algorithm to estimate both the position and orientation of the charging port relative to the plug 400.

This second algorithm can include a feature/pattern matching algorithm or a separate neural network model trained for six degrees of freedom registration. While these algorithms are less robust in accounting for spatial and environmental variance, less variance is expected due to the nature of the images captured close to the charging port 300. The fine localization stage 720 can better estimate both the position and orientation of the charging port due to the larger pixel footprint of the features of the charging port when the camera is located close to those features.

The plug 400 is inserted into the charging port based on the output of the fine localization procedure. Once the insertion is complete, the automated charging system 100 initiates the charging of the electric vehicle by transmitting a charging signal 704 to the power supply 110 that connects the AC power to the charging port 300 via the cable 155.

Figure 8:
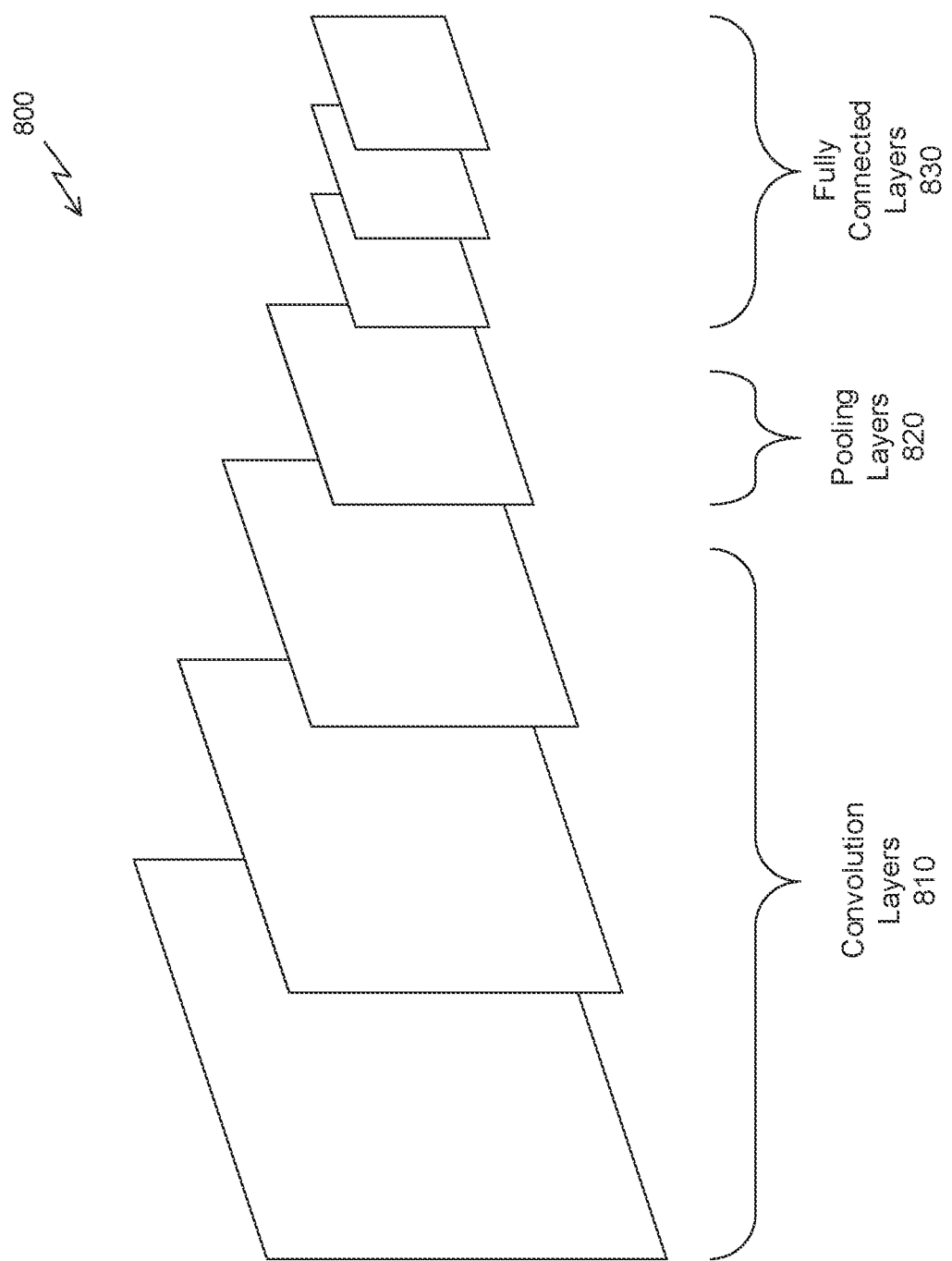
FIG. 8 illustrates a structure of a CNN, in accordance with some embodiments.

FIG. 8 illustrates a structure of a CNN 800, in accordance with some embodiments. The CNN can include a number of convolution layers 810, one or more pooling layers 820, and one or more fully connected layers 830. In practice, an input to the CNN 800 is processed by a first convolution layer 810 to generate a set of activations, which are processed by the next convolution layer 810. Each activation comprises a combination of weighted input values, possibly added to a bias value, and then processed by an activation function (e.g., a Sigmoid function, and ReLU function, or the like). As the input to the CNN in this case is an image, the weights comprise a convolution kernel that is applied across the image.

In some embodiments, for a particular layer, the dimensions of the input are the same as the dimensions of the output. In other words, the convolution operation is applied with a stride of one such that the convolution kernel is applied centered on each pixel. For other layers, the dimensions of the input are larger than the dimensions of the output. In other words, the convolution operation is applied with a stride greater than one such that the convolution kernel is applied sparsely (e.g., every other pixel, every third pixel, etc.) across the image. The convolution kernel can have a size such as 3×3, 5×5, 7×7 or so forth, and each weight of the convolution kernel can be positive, negative, or zero.

Pooling layers 820 may be included to reduce the dimensionality of the output activations using a particular pooling function, which selects a particular value or derives a particular value in a region (e.g., 2×2 pixel region) of the input activation map. Fully connected layers 830 calculate a number of values based on all values in the input activation map, where each output value is calculated as a weighted combination of all input values. The final fully connected layer 830 can generate the output of the CNN 800. In an embodiment, the output of the CNN 800 is a vector, where each element of the vector represents a different dimension estimated by the CNN 800.

In some embodiments, pooling layers 820 and convolution layers 810 may be interspersed (e.g., after every three convolution layers, there is a pooling layer, followed by more convolution layers, etc.). The number of each type of layer can vary based on the application. For example, simple tasks may require lower depth (i.e., number of layers) than more complex tasks in order to efficiently and accurately extract a set of features from the input image.

In some embodiments, the images are processed in a single channel (e.g., a luminosity channel in a YCrCb format) while, in other embodiments, the images are processed in multiple channels. For example, if the input image is received in a RGB format that includes pixel values for a red channel, green channel, and blue channel, respectively, then the CNN 800 can process each image channel separately using different convolution kernels to generate multiple activation channel outputs. Furthermore, each of the convolution layers can generate a different number of output activation channels than the input channels, where each output activation channel represents a different convolution kernel, for example. In some embodiments, a convolution layer can implement a three-dimensional (3D) convolution operation where the convolution kernel is applied to multiple input channels to generate activation values for a single output channel. In addition, multiple output channels can be generated based on different convolution kernels, each applied to one or more input channels.

Figure 9:
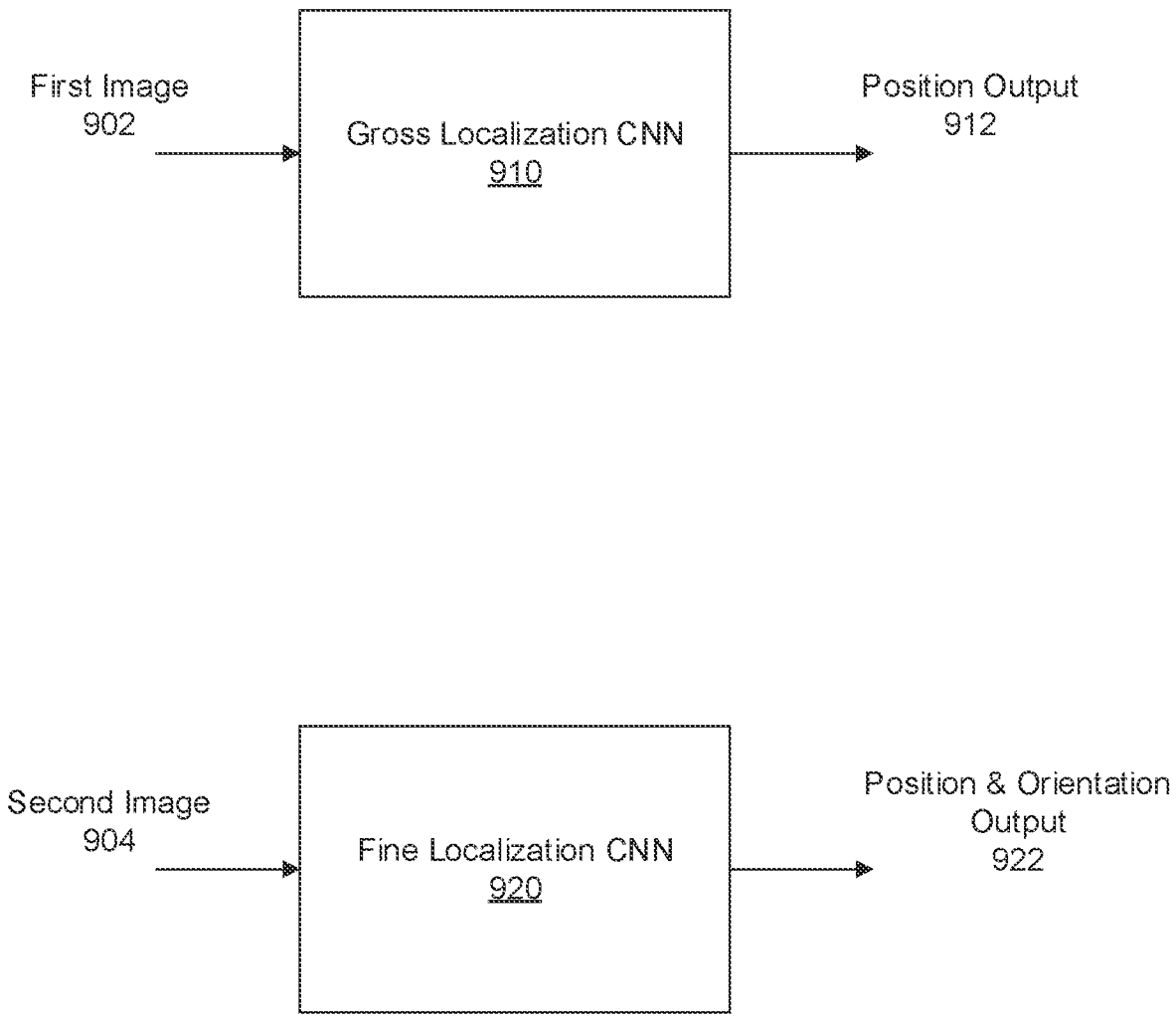
FIG. 9 illustrates a pair of neural networks configured to generate information for the control system, in accordance with some embodiments.

FIG. 9 illustrates a pair of neural networks configured to generate information for the control system 200, in accordance with some embodiments. As depicted in FIG. 9, the control system 200 can implement a pair of neural networks including a gross localization CNN 910 and a fine localization CNN 920, which can take the form of CNN 800 of FIG. 8. In some embodiments, the structure of the CNN 910 and the CNN 920 are identical, but the parameters of each layer may be different. In other words, the CNN 910 and the CNN 920 may have the same number and dimensionality of layers but, during training, the weight and bias values associated with each layer may be different. In addition, the dimensionality of the output of the CNN 910 is different from the CNN 920.

In an embodiment, the CNN 910 is trained using a set of training data to generate an estimate of a position output 912 (i.e., a vector that represents a position in space relative to the camera location). In an embodiment, the position output 912 is a 3-element vector that includes cylindrical coordinates $<\rho, \varphi, z>$ that represent a location proximate the charging port as identified in a first input image 902. Alternatively, the position output 912 is a 3-element vector that includes spherical coordinates $<\rho, \varphi, \theta>$ that represent a location proximate the charging port as identified in a first input image 902. The training data can include sample images and corresponding target output vectors that represents the location in space relative to the camera for each particular sample image.

Training is performed by processing the sample image by the CNN 910 to generate a position output 912. The position output 912 is compared with the target output vector to calculate a loss value (i.e., a measurement of the difference between the position output 912 and the target output vector). The loss value is then used to update the weights and bias values of the CNN 910 using, e.g., a back-propagation technique. A large number of sample images in the training data set is processed in this fashion until the weights and bias values of the CNN 910 are acceptable (e.g., the loss values for a batch of training samples is below a threshold value).

Conceptually, the CNN 910 is configured to extract features of the input image 902 that identify a location of the charging port based on the standard features of the charging port. The projected size of the charging port in the image 902 can then be used to estimate a target location from the current camera position. Because the camera is fixed in the plug 400, the horizontal pixel locations of the charging port indicate a potential adjustment to the angular dimension $\varphi$ associated with a target location proximate the charging port. Similarly, the vertical pixel locations of the charging port indicate a potential adjustment to the height dimension z associated with the target location, and the major dimension of a bounding box that includes the charging port indicate a potential adjustment to the radial dimension $\rho$ associated with the target location.

After the CNN 910 is trained, the CNN 910 can be deployed for inferencing of new input images captured by the camera assembly 450. In an embodiment, during normal operation, the control system 200 receives an image captured by the camera assembly and processes the image with the CNN 910. In an embodiment, the CNN 910 is implemented, at least in part, by the ML accelerator 250. The image is processed by each layer of the CNN 910 to generate the position output 912, which is then processed by the processor 210 to generate setpoints that are sent to the RTC 220 to cause the motors 235 to reposition the plug 450 using the three actuators associate with the position output 912. In this case, the three actuators control the length of the rigid chain 130 extended from the chassis 120, an angle of the rigid chain 130 relative to a central axis of the chassis 120, and a height of the rigid chain 130 (in the case of cylindrical coordinates) or an azimuth angle of the rigid chain 130 (in the case of spherical coordinates) relative to the floor (or any other horizontal plane).

In some embodiments, the position output 910 is an intermediate representation of a position. The position output 910 can be represented as a bounding box, a semantic map, or a point cloud, for example. The processor 210 can then translate the position output 912 into a vector in a coordinate system of the system 100. For example, the output of the CNN 910 can be four coordinates that represent a bounding box that encloses the charging port. The size of the bounding box can be used to infer a distance of the charging port from the camera and the relative location of the bounding box in the image can be used to infer a location of the charging port relative to the camera.

In some embodiments, the processor 210 first translates the position output 910 into a first coordinate in a first coordinate system. For example, the processor 210 can estimate the location of the charging port in a world space having Cartesian coordinates <x, y, z> having an origin located at the home position of the system. The processor 210 can then translate the first coordinate into a second coordinate using a transformation that converts the first coordinate into the coordinate system used by the system 100 (e.g., cylindrical coordinates or spherical coordinates).

Thus, the first coordinate system is agnostic to the coordinate system employed by the controller (e.g., the processor 210 and RTC 220) for positioning the plug 450.

It will be appreciated that, in some embodiments, the target output vectors are not intended to be incident with an actual location of the charging port, but are intended to be offset from the location of the charging port by some distance. The goal is to position the plug 450 close to the charging port without causing a collision of the plug 450 with any part of the electric vehicle. Once the plug is close to the final position, the control system switches to a fine localization procedure that utilizes the fine localization CNN 920 for inferencing.

In an embodiment, the CNN 920 is trained using a set of training data to generate an estimate of a position & orientation output 922 (i.e., a vector that represents both a position in space and an orientation of the charging port relative to the camera location). In an embodiment, the position & orientation output 922 is a 6-element vector that includes position coordinates <$\rho$, $\varphi$, z> as well as orientation coordinates <$\alpha$, $\beta$, $\gamma$> that represent a rotation around three orthogonal axes defined by the orientation of the camera assembly 450. Again, the training data can include sample images and corresponding target output vectors that represents the location in space and orientation of the charging port relative to the camera for each particular sample image.

Again, in other embodiments, the position orientation output 922 is an intermediate representation of a position, and can be used to derive, by the processor 210, a first coordinate in a system-agnostic coordinate system and a second coordinate in the coordinate system used by the controller.

Training of CNN 920 is performed similar to CNN 910, except using a different training data set with different sample images and corresponding target output vectors (i.e., 6-element target output vectors). In both the training of CNN 910 and the training of CNN 920, the training data set can be generated by setting up real-world examples of a plurality of different electric vehicles in different lighting conditions and with different positions of the camera assembly, taking a picture with the camera assembly, and measuring a distance and/or orientation of the camera assembly to the target location. In some cases, the training data set can include real sample images as well as synthetic sample images (i.e., computer generated images) in order to generate a more robust training data set without having to physically set up each individual scenario.

Conceptually, the CNN 920 is configured to extract features of the second input image 904 that identify an orientation of the charging port based on the standard features of the charging port. Because the camera is fixed in the plug 400, the orientation of the features of the charging port relative to a vertical axis indicate a potential adjustment to a rotational dimension $\gamma$ associated with an orientation of the charging port around a rotational axis normal to the image plane. Similarly, a ratio of the major and minor axes of the bounding box that includes the charging port indicate a potential adjustment to the rotational dimensions $\alpha$ and $\beta$ associated with horizontal and vertical axes. Of course, potential adjustments to the positional dimensions can be estimated simultaneously and can affect the potential adjustments to the other dimensions. For example, a change in position can increase or reduce the estimated adjustment to one or more of the rotational axes to reach the target location and orientation of the charging port relative to the plug 450.

It will be appreciated that, in some embodiments, the CNN 910 differs in structure from the CNN 920. For example, the CNN 920 may have more layers or different layers than the CNN 910. Alternately, the input image 902 may be of one format (e.g., RGB) whereas the input image 904 may be of another format (e.g., a single luminosity channel derived from an RGB image).

In some embodiments, one of CNN 910 or CNN 920, or both, may be replaced with other types of neural networks such as a recurrent neural network (RNN) or the like. In some embodiments, the neural network can be deployed to perform semantic segmentation of the input image, which classifies each pixel of the input image according to a semantic label. In some embodiments, the neural network is adapted to perform instance segmentation, which attaches semantic labels to each object having a particular semantic meaning in the image. Of course, the outputs of these types of neural networks would require further processing to convert these types of outputs into signals for controlling the actuators to reposition the plug 450. For example, the semantic segmentation map can be analyzed to identify pixels in the image associated with the charging port, and then the mean location of all such pixels can be used to identify a projected location of the charging port in the image plane and the distribution of pixels in the image associated with the charging port can be used to estimate a distance of the charging port from the image plane. A transformation of the projected location and distance can convert the segmentation map output into position information that is equivalent to the output of CNN 910 (i.e., a target location offset from the charging port in a three-dimensional space).

In other embodiments, one or both of CNN 910 and CNN 920 can be replaced, in whole or in part, with conventional image processing algorithms. For example, in an embodiment, CNN 910 can be replaced with another neural network configured to perform object detection. In an embodiment, the neural network is configured to generate coordinates of a bounding box in the image that includes the charging port. Types of neural networks for performing object detection are well-known in the art and can be adapted to detect the charging port using a new set of training data. The processor 210 can then take the coordinates of the bounding box generated by the neural network and process those coordinates to estimate adjustments to the position of the plug 450.

In yet other embodiments, one or both of CNN 910 or CNN 920 can be replaced with feature detection and/or feature matching algorithms, which may not employ a neural network at all. For example, the fine localization procedure can process the image to find edges (i.e., high gradient differences between pixels in the image) and then search the edges to locate a series of circles or ellipses that represent the structures of the charging port. By comparing the number and location of these features, the location and/or orientation of the charging port can be inferred. Any number of feature detection and/or feature matching algorithms can be employed in either the gross localization or fine localization procedures.

It will be appreciated that while the aforementioned techniques are described as being performed in cylindrical coordinates that match the implemented control of the actuators in the automated charging system 100, in other embodiments, such as a robotic system implemented by purely linear actuators, position coordinates may be given in Cartesian coordinates for x, y, and/or z coordinates, with an origin of the Cartesian coordinate system located at the location of the camera assembly 450. Similarly, spherical coordinates or any other type of coordinate system may be used for position as suitable for the particular robotics system utilized by the automated charging system 100.

In some embodiments, either the positional or rotational degrees of freedom can be limited to less than three degrees of freedom. For example, if the height of the plug is fixed, then only two degrees of freedom of the position of the plug can be adjusted. Similarly, if the plug can only rotate around one or two axes at the end of the end effector, then the rotational degrees of freedom can be less than three. Further, if additional degrees of freedom exist, such as with additional actuators that cause motion of additional linkages, etc., then the dimensionality of the output vectors and the training data set can be adjusted accordingly.

In some embodiments, the input image 902 and/or 904 may be pre-processed prior to being provided to the CNN 910 or CNN 920. For example, in some embodiments, an image filter is applied to the image 902/904 prior to processing by the CNN 910/920. Other types of pre-processing steps are contemplated as being within the scope of the embodiments detailed herein.

Figure 10A:
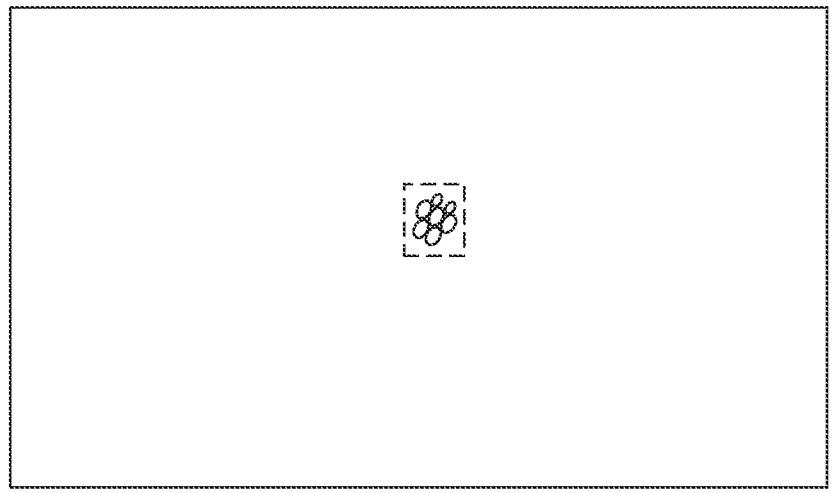
FIGS. 10A & 10B illustrate the gross localization and fine localization procedure, in accordance with some embodiments.
Figure 10B:
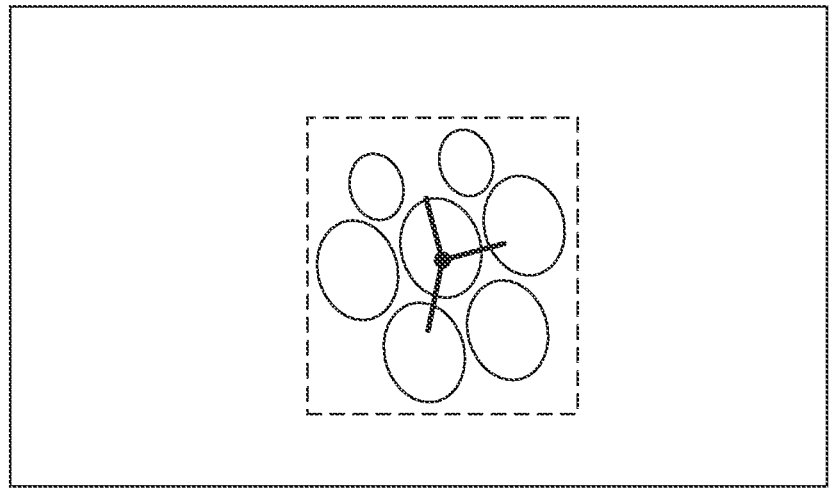

FIGS. 10A & 10B illustrate the gross localization and fine localization procedure, in accordance with some embodiments. As depicted in FIG. 10A, an image 902 is captured by the camera assembly 450. The image 902 includes a representation of the charging port 300 as viewed from the camera assembly 450. Although in reality the charging port will be visible along with other features and objects such as at least a portion of the electric vehicle, a door that covers the charging port when not in use, etc., only the projected image of the pins 305/315 of the charging port 300 is shown in image 902 to avoid obscuring the description of the gross localization procedure. The image 902 is processed by CNN 910, which locates the charging port 300 in the image (enclosed by the dashed bounding box) and generates an estimate of the position output 912 based on the view of the charging port in the image 902.

As depicted in FIG. 10B, an image 904 is captured by the camera assembly 450. The image 904 includes a representation of the charging port 300 as viewed from the camera assembly 450. It will be appreciated that the size of the charging port 300 in the image 904 is much larger than a size of the charging port 300 in the image 902, due to the proximate location of the camera assembly 450 being closer to the charging port 300 after the end of the gross localization procedure. The image 904 is processed by CNN 920, which generates an estimate of the position & orientation output 922 based on the view of the charging port in the image 904. In some embodiments, the image 904 can be pre-processed by other traditional image processing techniques, such as adjusting a contrast of the image or using multiple exposures to generate a high-dynamic range (HDR) image for processing by the CNN 920.

It will be appreciated that gross localization and/or fine localization may be performed in any number of steps, and various motion paths can be implemented by simply changing the training data set. For example, in the gross localization procedure, the target output vectors included in the training data set do not need to always point to the same location relative to the charging port 300 in the three-dimensional space. For some images that indicate that the charging port 300 is far away from the current location of the camera assembly 450, the location pointed to by the target output vector may result in the plug 450 being moved to a location that is a greater offset distance from the charging port 300 when compared to an offset distance for the target output vector associated with another image that indicates that the charging port 300 is closer to the current location of the camera assembly 450. Once the plug 450 has been moved by the control system 200, a new image can be captured by the camera assembly 450 and the gross localization procedure can be performed again based on the new image. As such, the training data set can define a motion path of the plug 450 based on the starting location of the plug 450 relative to the charging port 300 of the electric vehicle.

Alternatively, the processor 210 can limit the range of motion of the plug 450 during any one iteration of the gross localization procedure such that the farther the plug 450 needs to travel, the more iterations of the gross localization procedure will be performed. Limiting the range of motion can be implemented by limiting the maximum value in the position output 912 for any of the three coordinates of the vector. For example, the rigid chain 130 can only be extended or retracted 1 inch, rotated 5 degrees, or increased or decreased in height by 1 inch before a new image is captured and the gross localization procedure is performed again.

Figure 11:
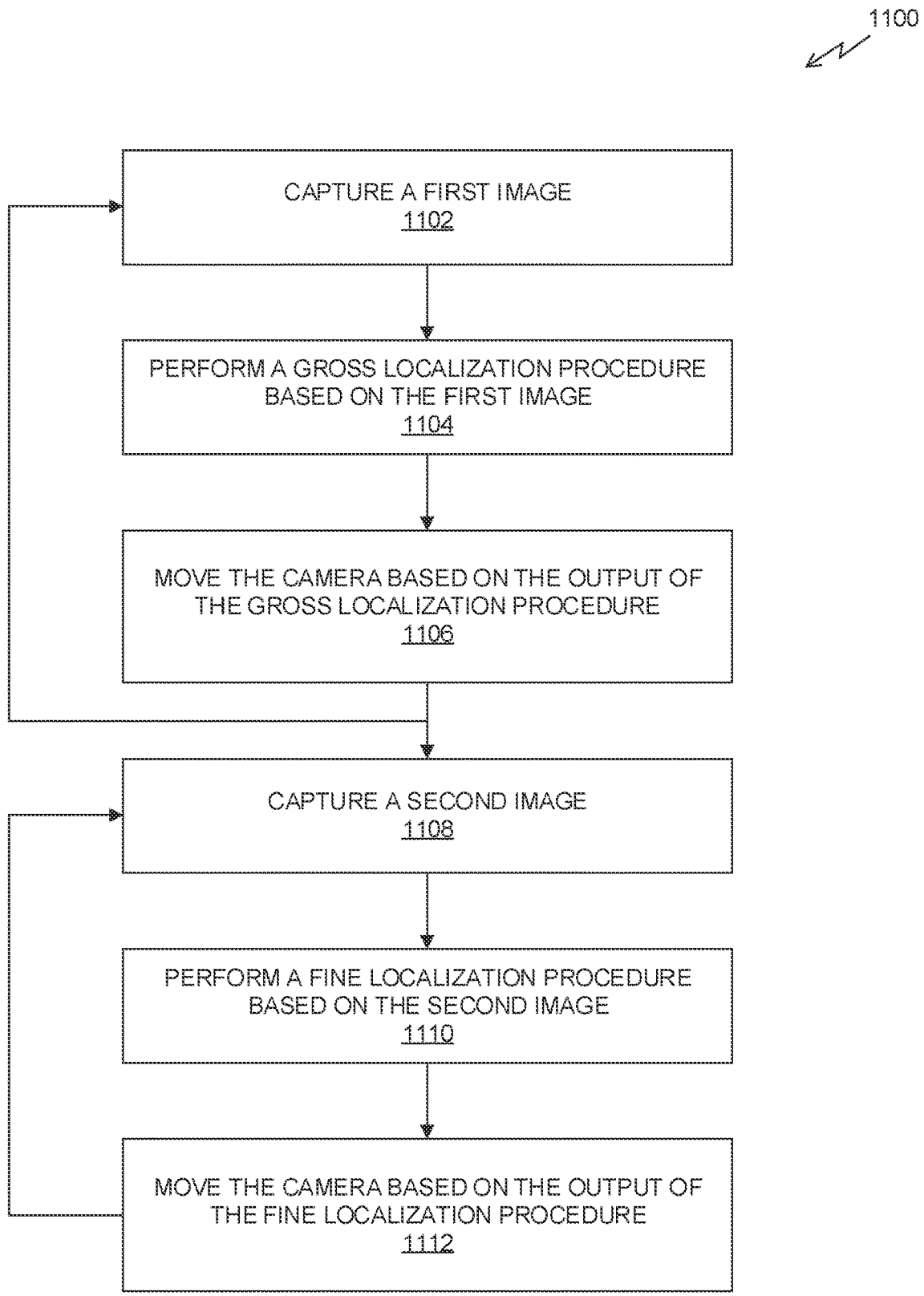
FIG. 11 is a flow diagram of a method for estimating localization of an object in an image relative to a position and orientation of a camera, in accordance with some embodiments.

FIG. 11 is a flow diagram of a method 1100 for estimating localization of an object in an image relative to a position and orientation of a camera, in accordance with some embodiments. The method 1100 can be performed by the automated charging system 100. In some embodiments, the steps detailed below can be implemented by one or more of the processor 210, the RTC 220, and/or the ML accelerator 250. In an embodiment, the memory 205 stores instructions that, when executed by one or more of the processor 210, the RTC 220, and/or the ML accelerator 250, causes the automated charging system 100 to implement one or more steps detailed below.

At step 1102, a first image is captured by a camera. In an embodiment, the camera assembly 450 captures a first image 902.

At step 1104, a gross localization procedure is executed to process the first image to estimate a target position in a three-dimensional space. In an embodiment, the first image 902 is processed by CNN 910 to generate a position output 912 that represents the target position of the camera assembly 450 relative to a current location of the camera assembly 450. It will be appreciated that the target position is not an estimated position of the object, but is a target position for the camera along a path based on the estimated position of the object.

At step 1106, the camera is moved based on the estimated target position. In an embodiment, the processor 210 transmits control signals (e.g., setpoints) to the RTC 220 to cause the RTC 220 to move one or more actuators to reposition the plug 450. In some embodiments, steps 1102-1106 can be repeated based on a new image to reposition the camera during one or more additional iterations of the gross localization procedure.

At step 1108, a second image is captured by a camera. In an embodiment, the camera assembly 450 captures a second image 904.

At step 1110, a fine localization procedure is executed to process the second image to estimate a new target position and a target orientation in the three-dimensional space. In an embodiment, the second image 904 is processed by CNN 920 to generate a position & orientation output 922 that represents the target position and orientation of the camera assembly 450 relative to a current location of the camera assembly 450. It will be appreciated that the target position and orientation is not an estimated position or orientation of the object, but is a target position for the camera along a path and an orientation of the camera at the end of that path based on the estimated position of the object.

At step 1112, the camera is moved based on the estimated new target position and target orientation. In an embodiment, the processor 210 transmits control signals (e.g., setpoints) to the RTC 220 to cause the RTC 220 to move one or more actuators to reposition the plug 450. In some embodiments, steps 1108-1112 can be repeated based on a new image to reposition the camera during one or more additional iterations of the fine localization procedure.

In an embodiment, the method 1100 is performed to insert a plug 450 into a charging port 300 of an electric vehicle, where a path of the plug is defined by executing the gross localization procedure and fine localization procedure, in that order, using images captured of the electric vehicle.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A method for estimating localization of an object in an image relative to a position and orientation of a camera, the method comprising:
    performing a gross localization procedure to estimate a target position in three-dimensional space based on a first image of the object captured by the camera;
    moving the camera based on the estimated target position;
    capturing a second image of the object by the camera after moving the camera based on the estimated target position;
    performing a second gross localization procedure to estimate a second target position in the three-dimensional space based on the second image of the object captured by the camera;
    moving the camera based on the second estimated target position;
    capturing a third image of the object by the camera after moving the camera based on the second estimated target position; and
    performing a fine localization procedure to estimate a new target position and a target orientation in the three-dimensional space based on the third image of the object.

2. The method of claim 1, wherein the gross localization procedure comprises processing the first image by a first convolutional neural network configured to generate a three-element output vector that represents the target position for the camera in the three-dimensional space relative to a current position of the camera, and wherein the fine localization procedure comprises processing the second image by a second convolutional neural network configured to generate an output vector with at least one position coordinate and at least one orientation coordinate.

3. The method of claim 2, wherein, prior to performing the gross localization procedure, the convolutional neural network is trained based on a set of training data that includes a set of input images and corresponding target output vectors.

4. The method of claim 2, wherein the three-element output vector includes a radial coordinate, an angular coordinate, and an azimuth coordinate.

5. The method of claim 2, wherein the at least one position coordinate includes at least one of a radial coordinate, an angular coordinate, and a height coordinate, and wherein the at least one orientation coordinate includes an angular rotation coordinate associated with a corresponding axis.

6. The method of claim 1, wherein the fine localization procedure comprises processing the second image to apply feature detection and/or feature matching algorithms to locate the object in the second image.

7. The method of claim 1, wherein the gross localization procedure comprises processing the first image by a neural network configured to perform object detection, wherein an output of the neural network comprises at least one of coordinates for a bounding box or a segmentation mask.

8. The method of claim 7, wherein the gross localization procedure further comprises processing the coordinates for the bounding box to calculate the estimated target position.

9. The method of claim 1, wherein the gross localization procedure comprises processing the first image by a first convolutional neural network, and the fine localization procedure comprises processing the second image by a second convolutional neural network.

10. The method of claim 9, wherein the first convolutional neural network includes fewer convolution layers than the second convolutional neural network.

11. The method of claim 1, wherein the gross localization procedure is performed by a processor, and wherein the fine localization procedure is performed by a machine learning (ML) accelerator connected to the processor.

12. The method of claim 11, wherein the ML accelerator is configured to implement a convolutional neural network configured to generate an output vector that includes three position coordinates and at least one orientation coordinate.

13. A system comprising:
    a camera assembly;
    a memory; and
    at least one processor coupled to the memory and configured to:
        perform a gross localization procedure to estimate a target position in three-dimensional space based on a first image of an object captured by the camera assembly;
        move the camera assembly based on the estimated target position;
        capture a second image of the object by the camera after moving the camera based on the estimated target position;
        perform a second gross localization procedure to estimate a second target position in the three-dimensional space based on the second image of the object captured by the camera;
        move the camera based on the second estimated target position;
        capture a third image of the object by the camera assembly after moving the camera based on the second estimated target position; and
        perform a fine localization procedure to estimate a new target position and a target orientation in the three-dimensional space based on third image of the object.

14. The system of claim 13, wherein the gross localization procedure comprises processing the first image by a first convolutional neural network configured to generate a three-element output vector that represents the target position for the camera in the three-dimensional space relative to a current position of the camera, and wherein the fine localization procedure comprises processing the second image by a second convolutional neural network configured to generate an output vector with at least one position coordinate and at least one orientation coordinate.

15. The system of claim 14, the system further comprising: a machine learning (ML) accelerator coupled to the at least one processor and configured to execute at least one of the first convolutional neural network or the second convolutional neural network.

16. The system of claim 13, wherein the fine localization procedure comprises processing the second image to apply feature detection and/or feature matching algorithms to locate the object in the second image.

17. The system of claim 13, wherein the camera assembly is mounted on a plug associated with a charging port of an electric vehicle, and wherein moving the camera assembly comprises generating signals for one or more actuators configured to move the plug in the three-dimensional space.

18. A non-transitory computer-readable storage medium storing instructions that, when executed by a processor, cause the processor to:
    perform a gross localization procedure to estimate a target position in three-dimensional space based on a first image of an object captured by a camera assembly;
    move the camera assembly based on the estimated target position;
    capture a second image of the object by the camera assembly after moving the camera assembly based on the estimated target position;
    perform a second gross localization procedure to estimate a second target position in the three-dimensional space based on the second image of the object captured by the camera assembly,
    move the camera assembly based on the second estimated target position;
    capture a third image of the object by the camera assembly after moving the camera assembly based on the second estimated target position; and
    perform a fine localization procedure to estimate a new target position and a target orientation in the three-dimensional space based on the third image of the object.

19. The non-transitory computer-readable storage medium of claim 18, wherein the gross localization procedure comprises processing the first image by a first convolutional neural network configured to generate a three-element output vector that represents the target position for the camera in the three-dimensional space relative to a current position of the camera.

20. The non-transitory computer-readable storage medium of claim 19, wherein the fine localization procedure comprises processing the second image by a second convolutional neural network configured to generate an output vector with at least one position coordinate and at least one orientation coordinate.

21. The non-transitory computer-readable storage medium of claim 18, wherein the fine localization procedure comprises processing the second image to apply feature detection and/or feature matching algorithms to locate the object in the second image.

22. The method of claim 1, further comprising:
    capturing a third image of the object by the camera after moving the camera based on the new target position and the target orientation; and
    performing a second fine localization procedure to estimate a further new target position and a further new target orientation in the three-dimensional space based on the third image of the object.

* * * * *